(12) United States Patent
D'Souza et al.

(10) Patent No.: US 8,730,213 B2
(45) Date of Patent: *May 20, 2014

(54) METHOD AND SYSTEM FOR DETECTING TOUCH EVENTS BASED ON REDUNDANT VALIDATION

(75) Inventors: Henry M. D'Souza, San Diego, CA (US); Joel C. Kent, Fremont, CA (US); James L. Aroyan, Santa Cruz, CA (US)

(73) Assignee: Elo Touch Solutions, Inc., Milpitas, CA (US)

( * ) Notice: Subject to any disclaimer, the term of this patent is extended or adjusted under 35 U.S.C. 154(b) by 1147 days.

This patent is subject to a terminal disclaimer.

(21) Appl. No.: 11/824,961

(22) Filed: Jul. 2, 2007

(65) Prior Publication Data

US 2009/0009488 A1 Jan. 8, 2009

(51) Int. Cl.
*G06F 3/041* (2006.01)
*G06K 9/00* (2006.01)
*G06F 3/043* (2006.01)

(52) U.S. Cl.
USPC ........... 345/177; 345/173; 345/156; 382/124; 178/18.04

(58) Field of Classification Search
None
See application file for complete search history.

(56) References Cited

U.S. PATENT DOCUMENTS

| | | | |
|---|---|---|---|
| 3,134,099 A | 5/1964 | Woo | |
| 5,162,618 A | 11/1992 | Knowles | |
| 6,456,952 B1 | 9/2002 | Nathan | |
| 6,525,717 B1 | 2/2003 | Tang | |
| 7,157,649 B2 | 1/2007 | Hill | |
| 7,184,898 B2 | 2/2007 | Sullivan et al. | |
| 7,345,677 B2 | 3/2008 | Ing et al. | |
| 7,411,581 B2 | 8/2008 | Hardie-Bick | |
| 7,583,808 B2 | 9/2009 | Smaragdis et al. | |
| 7,643,015 B2 | 1/2010 | Paradiso et al. | |
| 8,378,974 B2 * | 2/2013 | Aroyan et al. | 345/173 |
| 2002/0070926 A1 | 6/2002 | Kavanagh | |
| 2003/0066692 A1 | 4/2003 | Devige et al. | |
| 2004/0133366 A1 | 7/2004 | Sullivan et al. | |

(Continued)

FOREIGN PATENT DOCUMENTS

| | | |
|---|---|---|
| GB | 2385125 A | 8/2003 |
| WO | WO-00/38104 A1 | 6/2000 |

(Continued)

OTHER PUBLICATIONS

North et al., "Acoustic Pulse Recognition Enters Touch-Screen Market", Information Display, Palisades Institute for Research Services, New York, U.S., vo. 22, No. 12, Dec. 1, 2006, pp. 22-25.

(Continued)

*Primary Examiner* — Kenneth Bukowski
(74) *Attorney, Agent, or Firm* — Alston & Bird LLP

(57) ABSTRACT

A method of detecting a touch event on an acoustic fingerprint based touch system comprises digitizing at least two signals to form first and second sets of digitized signals. The at least two signals are received from at least two sensors on a touch panel. A frequency transform is performed upon the first and second sets of digitized signals to form first and second frequency transform data sets of frequency components. At least first and second live fingerprints are constructed wherein at least one of the first and second live fingerprints is based on the first and second frequency transform data sets. A touch location is identified based on the at least first and second live fingerprints.

22 Claims, 9 Drawing Sheets

(56) References Cited

U.S. PATENT DOCUMENTS

| | | |
|---|---|---|
| 2005/0174338 A1 | 8/2005 | Ing et al. |
| 2006/0232558 A1 | 10/2006 | Chien |
| 2006/0244732 A1 | 11/2006 | Geaghan |
| 2006/0262104 A1 | 11/2006 | Sullivan et al. |
| 2007/0188476 A1 | 8/2007 | Bayramoglu et al. |
| 2008/0180399 A1 | 7/2008 | Cheng |
| 2008/0316184 A1 | 12/2008 | D'Souza |
| 2009/0008160 A1 * | 1/2009 | Aroyan et al. .............. 178/18.01 |

FOREIGN PATENT DOCUMENTS

| | | |
|---|---|---|
| WO | WO-01/43063 A1 | 6/2001 |
| WO | WO 03/005292 A1 | 1/2003 |
| WO | WO-03/067511 A2 | 8/2003 |
| WO | WO 2004/053781 A2 | 6/2004 |
| WO | WO-2006/015888 A1 | 2/2006 |
| WO | WO 2006/069596 A1 | 7/2006 |
| WO | WO 2006/108443 A1 | 10/2006 |
| WO | WO2008/146098 A1 | 12/2008 |

OTHER PUBLICATIONS

Paradiso et al., "Passive Sensing for Tracking Knocks Atop Large Interactive Displays", Proceedings of IEEE, Sensors 2002, Orlando, Florida, 2002, vol. 1, pp. 521-527.

European Search Report & Written Opinion for EP 08159512.6 dated Jun. 9, 2011.

* cited by examiner

METHOD AND SYSTEM FOR DETECTING TOUCH EVENTS BASED ON REDUNDANT VALIDATION

BACKGROUND OF THE INVENTION

This invention relates generally to touch sensitive systems, and more particularly to identifying a location of a touch on a touch sensitive system that uses bending-wave touch sensors.

Touch panels are used to provide two-dimensional coordinate information. One example may be an opaque track pad while another example may be a transparent touchscreen placed in front of a display such as a liquid crystal display. Touch panels may be based on a variety of touch technologies including four-wire and five-wire resistive, capacitive, infrared and surface acoustic wave types, as well as bending-wave touch technologies.

In one approach, bending wave touch systems may detect a touch based on a tap of an object, such as a key or finger, used to excite bending waves in a substrate. These bending waves induce electrical signals in piezoelectric elements or sensors (piezos) bonded to the substrate. These signals are captured by electronics and processed to determine a set of (X,Y) coordinates of the touch position, such as by using time-of-flight methods to extract touch coordinate information from piezo signals.

Unfortunately, noise in the environment can cause problems, for smaller sensor sizes, such as those used in handheld applications and point-of-sale. Ambient noise may be detected by the touchscreen system as a false touch or series of false touches, causing confusion while actively using the touchscreen and/or by erroneously selecting options displayed on the screen. For example, in some applications, brief moments of corrupted signal data can be a major problem due to generation of false touch coordinates.

There remains a need for improved acoustic fingerprints and matching algorithms, as well as improved identification of corrupted signal data, for use in bending-wave touch systems.

BRIEF DESCRIPTION OF THE INVENTION

In one embodiment, a method of detecting a touch event on an acoustic fingerprint based touch system comprises digitizing at least two signals to form first and second sets of digitized signals. The at least two signals are received from at least two sensors on a touch panel. A frequency transform is performed upon the first and second sets of digitized signals to form first and second frequency transform data sets of frequency components. At least first and second live fingerprints are constructed wherein at least one of the first and second live fingerprints is based on the first and second frequency transform data sets. A touch location is identified based on the at least first and second live fingerprints.

In another embodiment, an acoustic fingerprint based touch system comprises a touch panel and at least two sensors interconnected with the touch panel. The at least two sensors obtain at least two signals associated with the touch panel. A processor module performs frequency transforms based on the at least two signals. The processor module produces frequency transform signals and constructs at least two live fingerprints based on the frequency transform signals. The processor module determines coordinates associated with a touch event on the touch panel based on the at least two live fingerprints.

In yet another embodiment, a computer readable medium for use in an acoustic fingerprint based touch system comprises instructions to digitize at least two signals to form first and second sets of digitized signals. Instructions are provided to perform a frequency transform upon the first and second sets of digitized signals to form first and second frequency transform data sets of frequency components. Instructions are also provided to construct at least two live fingerprints based on the first and second frequency transform data sets. Further instructions are provided to determine coordinates on the touch panel associated with a touch event on the at least two live fingerprints.

DETAILED DESCRIPTION OF THE INVENTION

Figure 1:
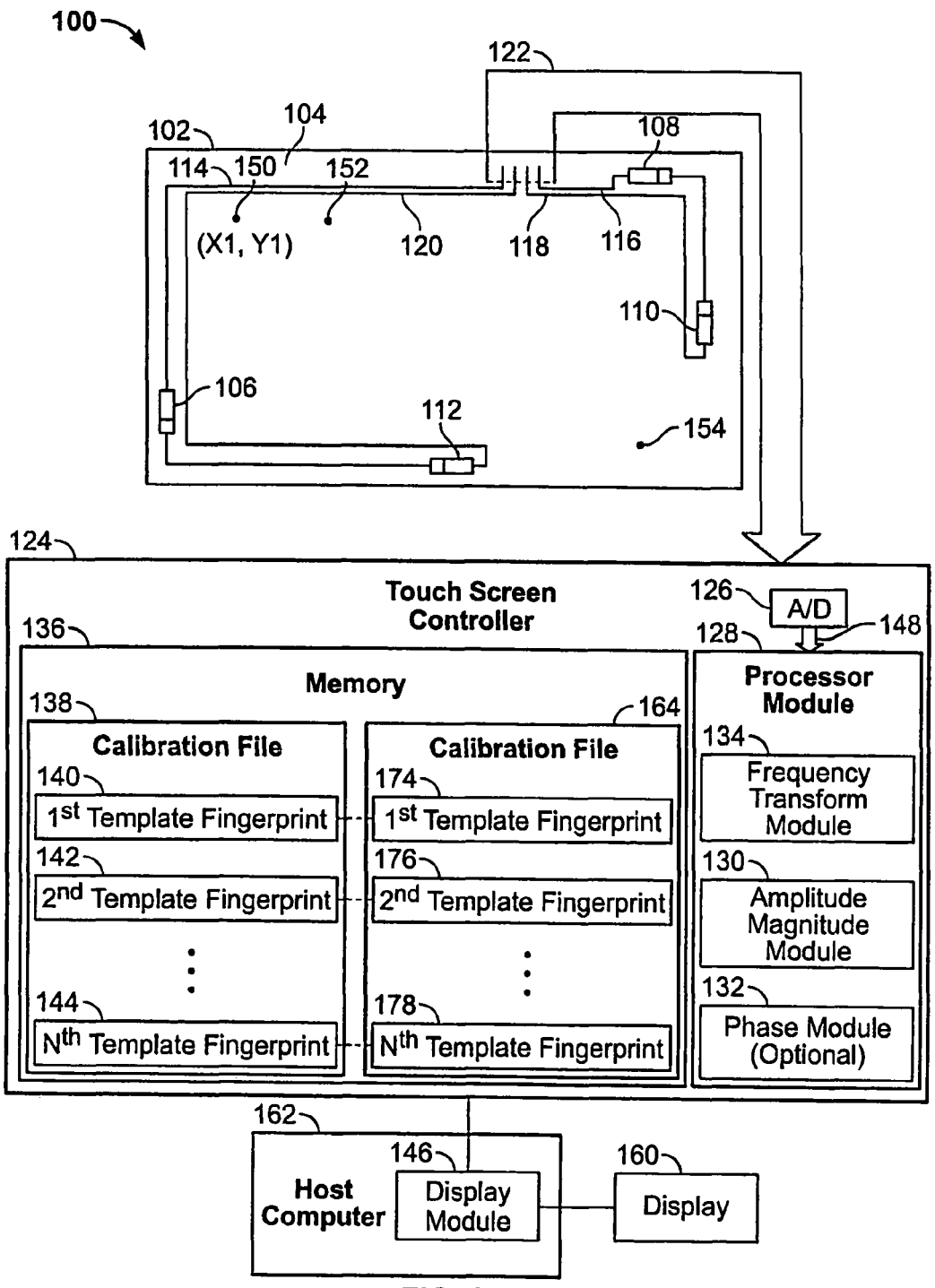
FIG. 1 illustrates an acoustic fingerprint based touch system formed in accordance with an embodiment of the present invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

FIG. 1 illustrates an acoustic fingerprint based touch system 100. The acoustic fingerprint based touch system 100 is an example of a bending-wave touch system. In one embodiment, the acoustic fingerprint based touch system 100 is a system in which the bending waves are touch generated and detected in the audio frequency range of 0-20 kHz and/or the low ultrasonic frequency range well below 1 MHz.

Touch panel 102 has a substrate 104, such as a sheet of glass, aluminum or other material, upon which sensors 106, 108, 110 and 112 and associated traces 114, 116, 118 and 120 are mounted. The sensors may be piezoelectric sensors, which may be abbreviated as "piezo sensors" or simply "piezos". The sensors may also be any other type of sensor that detects local motion or strain of substrate 104 such as accelerometers and strain gauges of various types. The sensors 106, 108, 110 and 112 may also be referred to as microphones. The sensors 106, 108, 110 and 112 detect sound and transmit sensor signals along the traces 114, 116, 118 and 120 which interface with a touchscreen cable 122 to convey the sensor signals to a touchscreen controller 124. In the embodiment shown in FIG. 1, the voltage difference between traces 114 and 120 is one analog signal generated by the anti-series combination of sensors 106 and 112. Similarly, the anti-series combination of sensors 108 and 110 produces an analog signal corresponding to the voltage difference between traces 116 and 118. Alternatively, sensors 112 and 110 may optionally be removed such that each of sensors 106 and 108 corresponds to one analog signal. In other embodiments, more than two analog signals are produced with either altered trace interconnections and/or additional sensors (not shown). It should be understood that the sensors 106, 108, 110 and 112 are not limited to the displayed placement with respect to the substrate 104 and/or each other.

The touch panel 102, when used as a touchscreen, is formed of a non-opaque material such as glass and is mounted in front of a display 160 that may support a graphical user interface (GUI) displaying buttons and icons or other graphical representations. In other embodiments, the touch panel 102 may be formed of an opaque or non-opaque material and may be located physically separate from display 160, such as to function as a track pad. It should be understood that although the touch panel 102 is primarily referred to in the following discussion, other touch panel, touchscreen and track pad designs may similarly be used.

In general, the touch system 100 recognizes the sound created when the substrate 104 is touched at a given position that may be described as an (X,Y) coordinate location. It should be understood that other coordinate systems may be used, such as polar coordinates with a radius and angle about the origin. A touch event at each different position on the substrate 104 generates a unique sound. More specifically, when a user touches a point on the substrate 104, one or more sensors 106, 108, 110 and 112 on the substrate 104 detect the sound and represent the sound as a signal. Whether the touch panel is a transparent touchscreen or an opaque or non-opaque touchpad, the principles of acoustic fingerprinting remain the same.

An analog to digital (A/D) converter 126 within the touchscreen controller 124 receives the two analog signals produced by sensors 106-112 over the touchscreen cable 122. The A/D converter 126 outputs digitized signals 148 that are received by a processor module 128. A frequency transform module 134 may perform a frequency transform, such as a Fourier transform, or more specifically a Fast Fourier Transform (FFT), on the digitized signals 148, outputting a frequency transform data set of frequency components associated with each of the sensor signals. An amplitude magnitude module 130 may then extract amplitude magnitude information from each of the frequency transform signals, and optionally, a phase module 132 may extract phase information from each of the frequency transform signals. The processor module 128 may construct a profile or acoustic fingerprint associated with the live touch event based on the amplitude magnitude information. In another embodiment, the processor module 128 may construct a profile or acoustic fingerprint associated with the live touch event that is based on both the amplitude magnitude information and the phase information. In yet other embodiments, the processor module 128 may construct the acoustic fingerprint based on the phase information or based on other information within the digitized signals 148.

A memory 136 may store a calibration file 138 that contains a set of acoustic fingerprints to allow the user to successfully interact with the display 160. Prior to normal use, (X,Y) coordinate positions on the touch panel 102 are associated with the sensor signals that are generated when a series of known (X,Y) coordinate locations are touched. The signals may be processed and stored as acoustic fingerprints in the calibration file 138, such as first, second through N template fingerprints 140, 142 and 144. In some embodiments, the signals may be processed differently to create a second calibration file 164 that is also stored in the memory 136 and contains a corresponding set of acoustic fingerprints. In this example, first, second through N template fingerprints 174, 176 and 178 correspond to the first, second through N template fingerprints 140, 142 and 144, respectively, and thus represent the same (X,Y) coordinate positions on the touch panel 102. Embodiments utilizing both of the calibration files 138 and 164 are discussed further below. It should be understood that additional calibration files may be used.

In the context of bending-wave touchscreen technology, acoustic fingerprints may also be referred without ambiguity simply as "fingerprints." By way of example, known location 152 may correspond to the second template fingerprint 142 and known location 154 may correspond to the Nth template fingerprint 144. The calibration file 138 therefore includes a plurality or collection of predetermined fingerprints or templates, each of which is associated with a particular (X,Y) location on the touch panel 102. Here, the term "template" refers to a predetermined fingerprint in a calibration file. In contrast, a live acoustic fingerprint computed for a run-time touch is referred to herein as a "live fingerprint" or a "real-time fingerprint". In the discussion of some embodiments, acoustic fingerprints may also be referred to as "profiles" or "trajectories", as discussed further below.

With acoustic fingerprinting, how the touch is generated can potentially have an undesired impact on the acquired acoustic fingerprint. For example, for two touches at the same (X,Y) coordinate location wherein the first touch is generated using a hard stylus and the second touch is generated using a rubber eraser, much different signals will be generated, and thus different acoustic fingerprints may be generated. A drag type of touch generates other types of signals. If an acoustic fingerprint is dependent on these and other touch characteristics, then for each touch position (X,Y) there will be numerous different acoustic fingerprints corresponding to different ways of touching the same point on the touch surface. Such acoustic fingerprint sensitivity to other touch characteristics diminishes the ability of a single template acoustic fingerprint to represent all touches at a given (X,Y) position. Therefore, it is desired to generate a unique template fingerprint associated with the (X,Y) location that correlates to all of the different types of signals, allowing signals from different types of touches to be mapped to the unique fingerprint. Furthermore, it may be desirable to have more than one type of template fingerprint where the template fingerprint of each type is unique for a given (X,Y) location.

In one embodiment directed to generating a unique fingerprint associated with an (X,Y) location, the first, second through N fingerprint templates 140, 142 and 144 may be based on magnitude ratios associated with two digitized signals as determined by the amplitude magnitude module 130, such as a ratio between the amplitude magnitudes of each of the two signals, or functions of the ratio. In another embodiment, the first, second through N template fingerprints 140, 142 and 144 may be based on magnitude ratios in combination with phase information determined by the phase module 132, such as phase difference information. Therefore, the acoustic fingerprint definitions may be functions of both magnitude ratios as well as phase differences.

During typical use, when a user touches the touch panel 102, the processor module 128 compares the live-touch acoustic fingerprint to at least a subset of the first, second through N template fingerprints 140, 142 and 144 stored in the calibration file 138. The best matching acoustic fingerprint or template may then be used to identify the location of the touch event.

The processor module 128 may then pass the (X,Y) coordinates to a display module 146 that may be stored within one or more modules of firmware or software. The display module 146 may be a graphical user interface (GUI) module such as the Microsoft Windows® operating system, for example. In one embodiment, the display module 146 is run on a host computer 162 that also runs an application code of interest to the user. The display module 146 determines whether the coordinates indicate a selection of a button or icon displayed on the display 160. If a button is selected, the host computer 162 or other component(s) (not shown) may take further action based on the functionality associated with the particular button.

An analogy can be drawn between acoustic fingerprinting and modern quantum field gauge theories of the fundamental forces of nature. In the field of physics research, "gauge" theories have helped quantum field theorists understand the fundamental forces of nature such as electromagnetic, weak and strong nuclear forces. Theories that have been found to correctly describe nature as observed in the laboratory come from only the very small subset of mathematical possibilities that satisfy the principle of "gauge invariance."

While the original meaning of the term "gauge" referred to a standard for measuring mechanical dimensions, as in "wire gauge", the meaning of "gauge" has been generalized to the non-mechanical setting of standards needed for quantitative descriptions of physical systems. In particular, a choice of "gauge" can be made when selecting a point in a circuit to label as "ground" or zero volts. While running a circuit simulation program such as SPICE, a "gauge transformation" may be performed by defining another point in the circuit as ground and rerunning the SPICE simulation. This gauge transformation will cause the numerically simulated voltage at every point in the circuit to change. Nevertheless, the SPICE program is "invariant" under this gauge transformation as the change in reference ground definition causes no changes of any predictions for electronics laboratory measurements such as a voltage difference between two points in the circuit. This "gauge invariance" may be used as a debugging and quality-check tool. Lack of such gauge invariance in preliminary circuit-simulation code, i.e. changes in testable predictions from a redefinition of the reference ground point, would flag coding errors. An example of such a coding error is an Ohm's Law calculation of the current through a resistor which incorrectly uses the absolute voltage at one resistor terminal rather than correctly uses the voltage difference between the two resistor terminals.

The principles of gauge invariance can be applied to bending-wave touch technology to sort between good and bad candidate acoustic fingerprint definitions. For touchscreen applications, the characteristic of interest is the touch location, that is, the (X,Y) coordinates of the touch. Typically, all other touch characteristics, such as force, are irrelevant to the application. If acoustic fingerprint definition is impacted by any other touch characteristic, the correct (X,Y) coordinate location may not be identified and selected, creating many problems within an application. Therefore, a "gauge invariant acoustic fingerprint" that depends only the on the touch coordinates (X,Y) is desirable.

The phase difference profile $\Delta\phi(\omega)$ is insensitive to other identified touch characteristics while being sensitive to the touch position. This is the theoretical basis of the historical observation that the phase difference profile outperforms other candidate acoustic fingerprint definitions, such as normalized amplitude profiles.

As discussed previously, the overall strength of the touch is one touch characteristic other than touch position. For example, doubling the strength of a touch, that is, touching in the same fashion with twice the force, will increase the signal amplitudes. In this example, the signal amplitudes are doubled, that is $S_1(t) \rightarrow S'_1(t) = 2 \cdot S_1(t)$ and $S_2(t) \rightarrow S'_2(t) = 2 \cdot S_2(t)$. The apostrophe "'" is used to indicate a gauge transformed signal. $S'_1(t)$ and $S'_2(t)$ are "gauge transformed" signals due to the doubling of the touch strength. The gauge transformation, that is, the change of gauge (i.e. the change of method of touching at the touch location) has the same effect on both signals. Another touch characteristic is the exact timing of the touch. For example, the "gauge transformed" signals $S_1(t) \rightarrow S'_1(t) = S_1(t-\Delta t)$ and $S_2(t) \rightarrow S'_2(t) = S_2(t-\Delta t)$) indicate that the gauge transformed signals $S'_1(t)$ and $S'_2(t)$ correspond to a touch that is delayed by a time interval $\Delta t$ but is otherwise identical. Yet another characteristic of a touch is the power spectrum of the touch induced forces that excite bending waves; for example, switching from a hard stylus to a soft stylus changes the touch power spectrum. In the frequency domain, this corresponds to the "gauge transformed" signals $S_1(\omega) \rightarrow S'_1(\omega) = F(\omega) \cdot S_1(\omega)$ and $S_2(\omega) - S'_2(\omega) = F(\omega) \cdot S_2(\omega)$ where $F(\omega)$ relates to the frequency characteristics of the touch force and is the ratio (in general complex) of the power-spectrum altered touch force to the unaltered touch force as a function of frequency $\omega$. All these types of gauge transformed signals correspond to touches at exactly the same (X,Y) touch location. An acoustic fingerprint definition that is gauge sensitive, that produces different results depending on exactly how the point (X,Y) is touched, is undesirable. In contrast, a "gauge invariant" acoustic fingerprint that depends only on the touch (X,Y) coordinates and is independent of all other touch characteristics, is desired for use in acoustic fingerprint based touch systems.

Mathematical criteria for the concepts of undesired gauge sensitivity and desired gauge invariance in the context of bending-wave touch technology can be further developed with the aid of a magnitude gauge function $G(\omega)$ and a phase gauge function $\gamma(\omega)$. Even for a fixed touch location, a change in how a touch is generated will, in general, alter signal amplitude magnitudes and/or phases in complex ways as a function of frequency. However, any change in how one touches a given location affects both signals in the same manner. Stated in mathematical terms, in general, gauge transformed frequency domain signals are as follows.

$$S_1(\omega)=A_1(\omega)\cdot e^{i\phi_1(\omega)+i\gamma(\omega)} \rightarrow A'_1(\omega)\cdot e^{i\phi'_1(\omega)}=G(\omega)\cdot A_1(\omega)\cdot e^{i\phi_1} \quad \text{Equ. 6}$$

$$S_2(\omega)=A_2(\omega)\cdot e^{i\phi_2(\omega)+i\gamma(\omega)} \rightarrow A'_2(\omega)\cdot e^{i\phi'_2(\omega)}=G(\omega)\cdot A_2(\omega)\cdot e^{i\phi_2} \quad \text{Equ. 7}$$

The two signals $S_1(\omega)$ and $S_2(\omega)$ are changed in the same way. Equivalently the gauge transformation can be expressed as follows.

$$A_1(\omega) \rightarrow A'_1(\omega)=G(\omega)\cdot A_1(\omega) \quad \text{Equ. 8}$$

$$A_2(\omega) \rightarrow A'_2(\omega)=G(\omega)\cdot A_2(\omega) \quad \text{Equ. 9}$$

$$\phi_1(\omega) \rightarrow \phi'_1(\omega)=\phi_1(\omega)+\gamma(\omega) \quad \text{Equ. 10}$$

$$\phi_2(\omega) \rightarrow \phi'_2(\omega)=\phi_2(\omega)+\gamma(\omega) \quad \text{Equ. 11}$$

The previous example of doubled touch strength corresponds to a gauge transformation with the gauge functions $G(\omega)=2$ and $\gamma(\omega)=0$. Delay of the touch by a time $\Delta t$ corresponds to the gauge transformation with the gauge functions $G(\omega)=1$ and $\gamma(\omega)=\omega\cdot\Delta t$. Changes in the touch power spectrum correspond to gauge transformations with more complex forms of the gauge functions $G(\omega)$ and $\gamma(\omega)$. As seen in the above equations, all the signal components $A_1(\omega)$, $A_2(\omega)$, $\phi_1(\omega)$ and $\phi_2(\omega)$ are sensitive to gauge transformations and hence are sensitive to changes to touch characteristics beyond (X,Y) coordinates. A gauge transformation of the phase-difference profile is shown below.

$$\Delta\phi(\omega) \rightarrow \Delta\phi'(\omega) = \phi'_2(\omega) - \phi'_1(\omega) = \\ \{\phi_2(\omega)+\gamma(\omega)\} - \{\phi_1(\omega)+\gamma(\omega)\} = \phi_2(\omega) - \phi_1(\omega) = \Delta\phi(\omega) \quad \text{Equ. 12}$$

As indicated by the result $\Delta\phi(\omega) \rightarrow \Delta\phi(\omega)$, Equ. 12 illustrates that the phase-difference profile is unaffected by a gauge transformation of touch characteristics. Thus the phase-difference profile is a gauge invariant acoustic fingerprint, depending only on the touch location and not on any other characteristics of the touch. In contrast, the normalized amplitudes discussed previously are gauge sensitive and depend on the details of the power spectrum of the touch force, as shown below in Equ. 13 and 14:

$$a_1(\omega) \rightarrow a'_1(\omega)=A'_1(\omega)/A'^{MAX}_1=G(\omega)\cdot A_1(\omega)/\text{Max}\{G(\omega)\cdot A_1(\omega)\} \neq a_1(\omega) \quad \text{Equ. 13}$$

$$a_2(\omega) \rightarrow a'_2(\omega)=A'_2(\omega)/A'^{MAX}_2=G(\omega)\cdot A_2(\omega)/\text{Max}\{G(\omega)\cdot A_2(\omega)\} \neq a_2(\omega) \quad \text{Equ. 14}$$

Therefore, the phase-difference profile provides an effective acoustic fingerprint because it is a gauge-invariant acoustic fingerprint, that is, it is insensitive to uncontrolled and irrelevant touch characteristics. However, the phase-difference profile is not unique in this gauge-invariant property. In particular, the magnitude ratio $A_2(\omega)/A_1(\omega)$ is also gauge invariant, that is, independent of irrelevant touch characteristics beyond the (X,Y) coordinate position, as illustrated in Equ. 15 wherein the gauge function $G(\omega)$ cancels out.

$$A_2(\omega)/A_1(\omega) \rightarrow A'_2(\omega)/A'_1(\omega)=\{G(\omega)\cdot A_2(\omega)\}/\{G(\omega)\cdot A_1(\omega)\}=A_2(\omega)/A_1(\omega) \quad \text{Equ. 15}$$

The result of Equ. 15 illustrates that $A_2(\omega)/A_1(\omega) \rightarrow A_2(\omega)/A_1(\omega)$.

Any function $f(x)$ of the magnitude ratio is also gauge-invariant.

$$f(A_2(\omega)/A_1(\omega)) \rightarrow f(A'_2(\omega)/A'_1(\omega))=f(A_2(\omega)/A_1(\omega)) \quad \text{Equ. 16}$$

Thus, $f(A_2(\omega)/A_1(\omega)) \rightarrow f(A_2(\omega)/A_1(\omega))$. For example, if $f(x)=1/x$, it can be seen that $A_1(\omega)/A_2(\omega)$ is also gauge invariant as expected from simply swapping the arbitrary labels "1" and "2." In the cases wherein $f(x)=(x-1)/(x+1)$, $f(x)=(x^2-1)/(x^2+1)$, and $f(x)=\arctan(x)$, the following gauge invariant acoustic fingerprints can be determined.

$$(A_2(\omega)-A_1(\omega))/(A_2(\omega)+A_1(\omega)) \quad \text{Equ. 17}$$

$$(A_2(\omega)^2-A_1(\omega)^2)/(A_2(\omega)^2+A_1(\omega)^2) \quad \text{Equ. 18}$$

$$\arctan(A_2(\omega)/A_1(\omega)) \quad \text{Equ. 19}$$

Therefore, as any function of the magnitude ratio is shown to be gauge invariant, there is a high degree of flexibility in how the magnitude ratio may be constructed to obtain the acoustic fingerprints. For coding purposes, Equ. 17-19 represent choices for an acoustic fingerprint that have an advantage of a finite range (range of $-1$ to $+1$ for Equ. 17 and 18 and range of 0 to $\pi/2$ for Equ. 19) both of which may easily be scaled, for example, to the range of an 8-bit integer. In contrast, the magnitude ratio $A_2(\omega)/A_1(\omega)$ has a range from zero to infinity and thus may result in a higher level of complexity during implementation. The magnitude ratio $A_2(\omega)/A_1(\omega)$ as well as various functions of the magnitude ratio $f(A_2(\omega)/A_1(\omega))$ such as $(A_2(\omega)-A_1(\omega))/(A_2(\omega)+A_1(\omega))$ and $\arctan(A_2(\omega)/A_1(\omega))$ all provide gauge invariance; thus the term "magnitude ratio" is broadly defined to include both $A_2(\omega)/A_1(\omega)$ and all functions thereof.

By way of example only, a calibration file of acoustic fingerprints may be constructed by tapping a 15-inch (approximately 380 mm) diagonal bending-wave sensor at each point in a 76×57 grid of calibration points, for a total of N=4332 calibration points. For example, the touch panel 102 of FIG. 1 may be touched at the calibration points to generate the first, second through N template fingerprints 140, 142 and 144 within the calibration file 138. At each of these 4332 calibration point locations, a pair of analog signals (such as the signal from the sensors 106 and 112 and the signal from the sensors 108 and 110) may be digitized by the A/D converter 126, frequency transformed by the frequency transform module 134 such as by using a Hamming or Hanning filter followed by an FFT. For example, for each of 900 (out of 1024) selected discrete FFT frequencies in a range from 2.1 kHz to 19.3 kHz, $\arctan(A_2(\omega)/A_1(\omega))$ may be computed, scaled and rounded to an integer range from 0 to 127, and stored as 8-bit integer. The calibration file 138 of reference acoustic fingerprint templates may then be used with a matching algorithm to identify the touch locations of live signals resulting from touch events.

Figure 2:
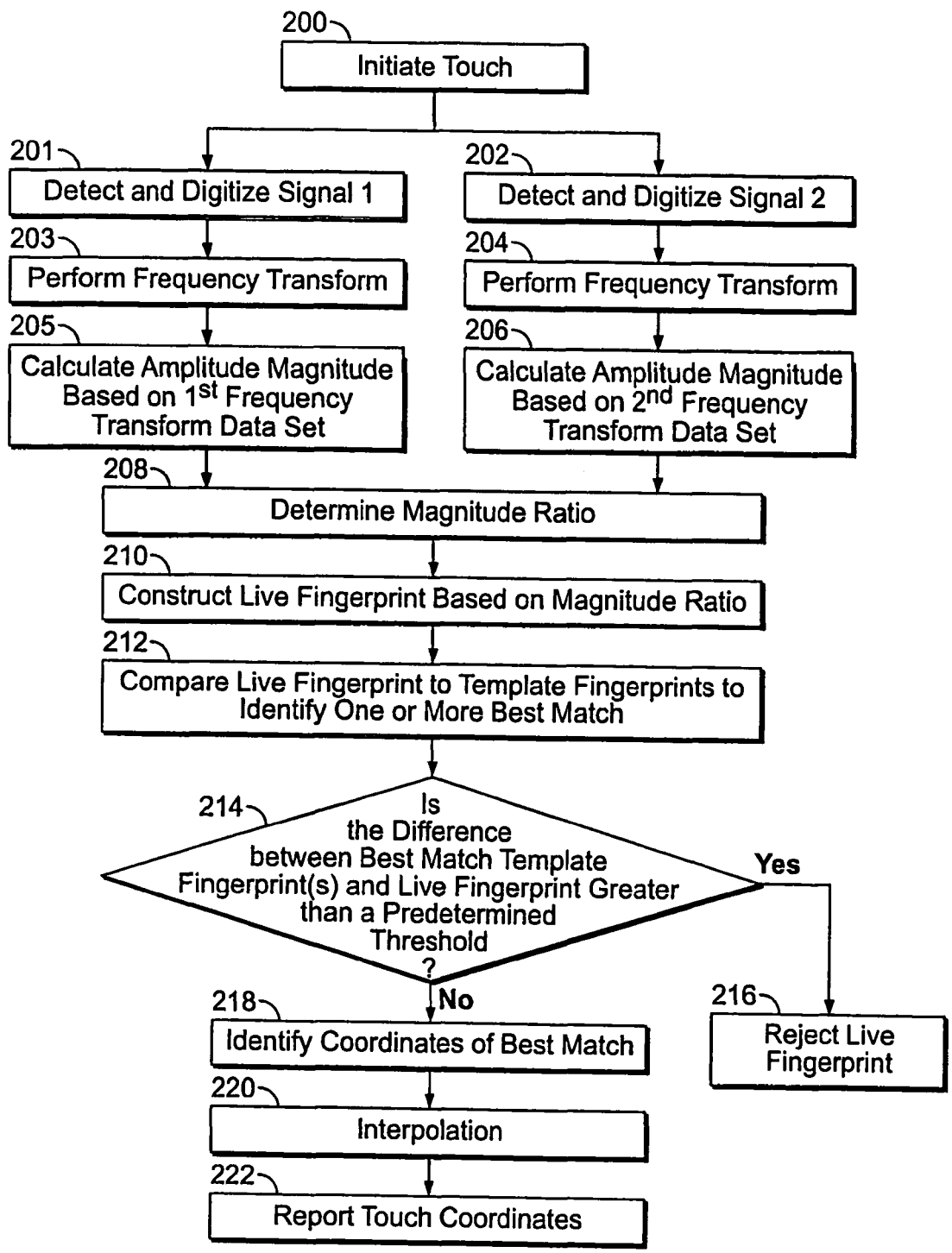
FIG. 2 illustrates a method for determining a location of a live touch event on the touch panel of FIG. 1 based on a single acoustic fingerprint constructed using magnitude ratios in accordance with an embodiment of the present invention.

FIG. 2 illustrates a method for determining a location of a live touch event on a touch panel 102 based on a single acoustic fingerprint that is constructed using magnitude ratios. At 200, an operator may initiate a touch event at an (X,Y) location on the touch panel 102, such as point (X1,Y1) 150 on FIG. 1. Because magnitude ratios are used, only the touch location will be considered, and other factors such as the implement used to create the touch or the force applied do not impact the determination of the correct location. It should be noted that the placement of the sensors 106, 108, 110 and 112 on the touch panel 102 are exemplary and are not limiting.

At 201 and 202, the A/D converter 126 detects the two signals from the four sensors 106, 108, 110 and 112, which may be conveyed on traces 114, 116, 118 and 120 to touch-screen cable 122. The A/D converter 126 outputs the sets of digitized signals 148 to the processor module 128.

At 203 and 204 the frequency transform module 134 performs a frequency transform, such as a Fourier transform, and more specifically an FFT, on the sets of digitized signals 148 corresponding to the two sensor signals, and outputs first and second frequency transform data sets. At 205 and 206, the amplitude magnitude module 130 calculates amplitude magnitudes for each of the first and second frequency transform data sets over the frequency range. For example, first and second sets of amplitude magnitudes ($A_1(\omega)$ and $A_2(\omega)$) associated with the first and second frequency transform data sets may be calculated. At 208, the amplitude magnitude module 130 determines the magnitude ratio based on the amplitude magnitudes of 205 and 206.

At 210, the processor module 128 may construct a live fingerprint based on the magnitude ratio. The live fingerprint is representative of the live touch event that includes each frequency band (that may in some embodiments be limited to a selected range) of the frequency transform. At 212, the processor module 128 compares the live fingerprint to the template fingerprints, such as the first through N template fingerprints 140-144 stored in the calibration file 138, to determine differences there-between and to identify one or more of the template fingerprint that is/are a "best match" with respect to the acoustic fingerprint. In this example, the first through N template fingerprints 140-144 are representative of the magnitude ratio as a function of frequency. The processing method that is used to acquire the live fingerprint is also used to build the template fingerprints in the calibration file used for comparison. In one embodiment, the processor module 128 may determine a score or a scoring relation for each comparison, wherein the score may be a sum of the absolute differences over the frequency range. The score represents how different, or how closely matched, the live fingerprint is with respect to each of the first through N template fingerprints 140-144 in the calibration file 138. The processor module 128 may determine the lowest score(s) that indicates one, or optionally more than one, possible candidate positions or best matching template fingerprint.

At 214 the processor module 128 may compare the difference between the best matching template fingerprint and the live fingerprint to a predetermined threshold. If the difference is greater than the predetermined threshold, the method passes to 216 and the live fingerprint is rejected. In other words, the live fingerprint does not sufficiently match any of the template fingerprints in the calibration file 138. If the difference at 214 is less than the predetermined threshold, at 218 the processor module 128 identifies the coordinates, such as (X,Y) coordinates, of the best match identified at 212. The processor module 128 may then interpolate at 220 to further refine the location of the live touch event on the touch panel 102 based on the coordinates of the best match template fingerprint and the coordinates and scores of the neighboring template fingerprints. Then at 222, the touch coordinates are reported to the host computer 162. If the live touch event corresponds to a selection on the display 160, the host computer 162 may initiate a particular action or function and/or update the display 160.

In addition to the magnitude ratio (for example $A_2(\omega)/A_1(\omega)$ or any function thereof), the set of possible gauge-invariant acoustic fingerprints includes functions of both the magnitude ratio and the phase difference profile $\Delta\phi(\omega)$. An acoustic fingerprint can incorporate both magnitude ratios and phase differences. Another approach is one in which one acoustic fingerprint uses magnitude ratios and a distinct separate acoustic fingerprint uses phase differences.

Figure 3:
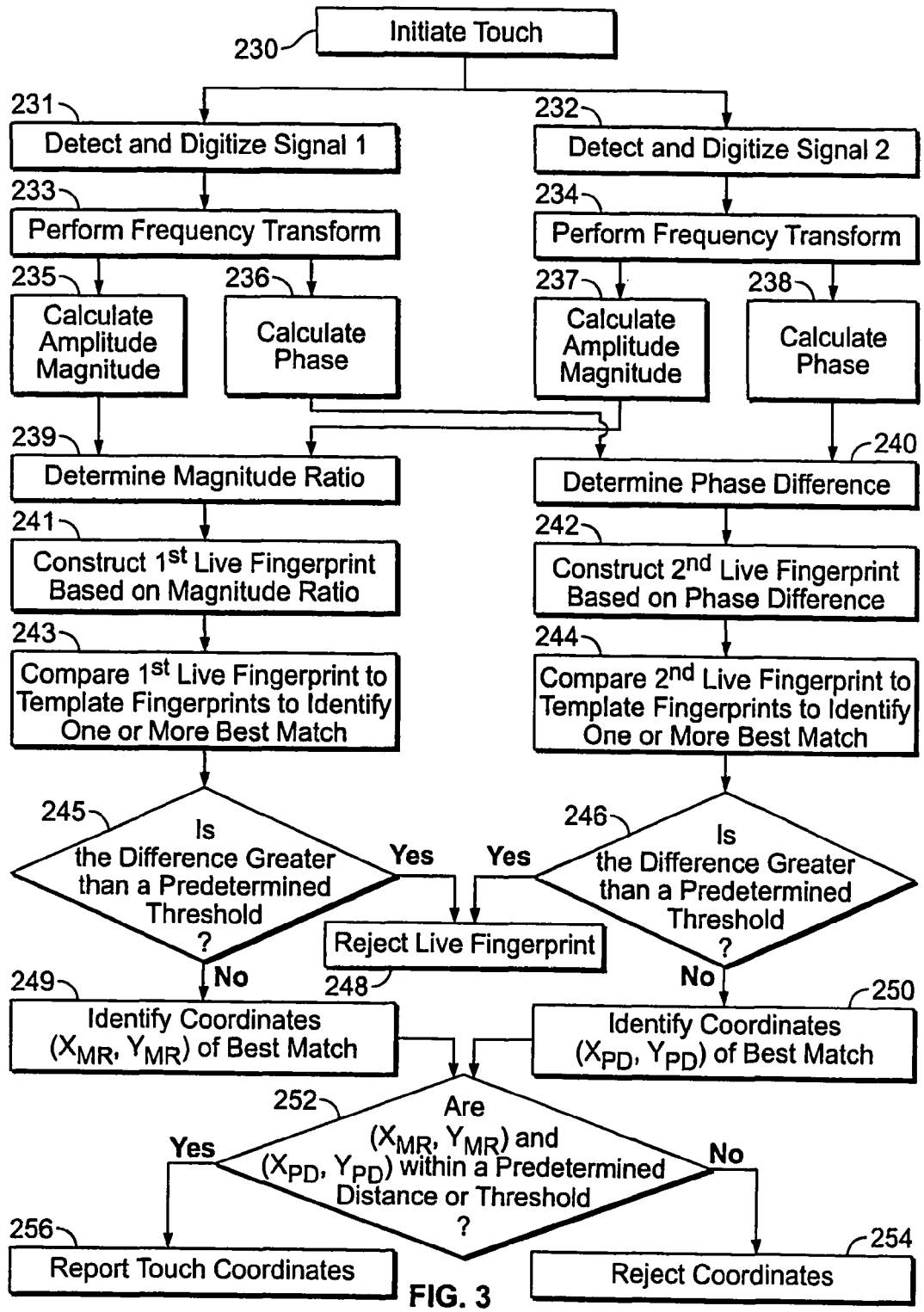
FIG. 3 illustrates a method for determining a location of a live touch event on the touch panel of FIG. 1 based on two acoustic fingerprints wherein one fingerprint is constructed using magnitude ratios and another is constructed using phase differences in accordance with an embodiment of the present invention.

FIG. 3 illustrates a method for determining a location of a live touch event on the touch panel 102 of FIG. 1 based on two acoustic fingerprints wherein one acoustic fingerprint is constructed using magnitude ratios and another acoustic fingerprint is constructed using phase differences. The method of FIG. 3 illustrates an example of redundant validation wherein more than one acoustic fingerprint is generated based on a single stimulus or touch event. By using more than one acoustic fingerprint, the issue of noise sensitivity in small screens is better addressed. Redundant validation may be used together with one or two of the acoustic fingerprints constructed using magnitude ratio. Alternatively, magnitude ratio may be used to construct one acoustic fingerprint while phase difference may be used to construct a second acoustic fingerprint. In another embodiment, phase difference may be used to construct two acoustic fingerprints, and in yet another embodiment, a different acoustic fingerprint construction may be used to construct one or both of the acoustic fingerprints.

At 230, an operator initiates a touch event at an (X,Y) location on the touch panel 102, such as point (X1,Y1) 150 on FIG. 1 as discussed previously with FIG. 2. At 231 and 232, the A/D converter 126 detects the two signals as discussed previously and outputs the sets of digitized signals 148 to the processor module 128.

At 233 and 234 the frequency transform module 134 performs a frequency transform on the sets of digitized signals 148 corresponding to the two signals, and outputs first and second frequency transform data sets. In contrast with FIG. 2, information is extracted from the first and second frequency transform data sets based on magnitude and phase and is used to construct two separate fingerprints.

The construction of the acoustic fingerprint based on the magnitude ratio uses the process a similar process as in FIG. 2. At 235 and 237, the amplitude magnitude module 130 calculates first and second sets of amplitude magnitudes based on the frequency transform data sets of 233 and 234, respectively, over the frequency range. At 239, the amplitude magnitude module 130 determines the magnitude ratio based on the amplitude magnitudes calculated in 235 and 237. At 241, the processor module 128 may construct a first live fingerprint based on the magnitude ratio. At 243, the processor module 128 compares the first live fingerprint of the live touch event to the template fingerprints to determine differences there-between and to identify the template fingerprint that is a "best match" with respect to the live fingerprint. The template fingerprints may be the first, second through N template fingerprints 140, 142 and 144 within the calibration file 138. The processor module 128 may determine the best score(s) that indicates a possible candidate position or best matching template fingerprint.

At 245 the processor module 128 may compare the difference between the best matching template fingerprint and the live fingerprint to a predetermined threshold. If the difference is greater than the predetermined threshold, the method passes to 248, the live fingerprint is rejected and the method is terminated. If the difference at 245 is less than the predetermined threshold, at 249 the processor module 128 identifies the ($X_{MR}$,$Y_{MR}$) coordinates of the best match identified at 243.

The construction of the acoustic fingerprint based on the phase difference uses data sets of 233 and 234. Phases are determined and a phase difference profile is computed. At 236 and 238, the phase module 132 determines the phase of each of the frequency transform data sets of 233 and 234, respectively, and at 240 the phase module 132 determines the phase difference between the two signals. At 242, the processor module 128 may construct a live fingerprint based on the phase difference. At 244, the processor module 128 compares the live fingerprint of the live touch event to the template fingerprints to determine differences there-between and to identify the template fingerprint that is a "best match" with respect to the live fingerprint. In this example, the template fingerprints may be the first, second through N template fingerprints 174, 176 and 178 within the calibration file 164. Again, the processor module 128 may determine the score(s) that indicates a possible candidate position or best matching template fingerprint.

At 246 the processor module 128 may compare the difference between the best matching template fingerprint and the acoustic fingerprint to a predetermined threshold. If the difference is greater than the predetermined threshold, the method passes to 248 and the acoustic fingerprint is rejected and the method is terminated. If the difference at 246 is less than the predetermined threshold, at 250 the processor module 128 identifies the $(X_{PD}, Y_{PD})$ coordinates of the best match identified at 244.

At 252, the processor module 128 considers both the touch coordinates $(X_{MR}, Y_{MR})$ based on the best matching magnitude-ratio template as well as the touch coordinates $(X_{PD}, Y_{PD})$ based on the best matching phase-difference template. In this case, two independent touch coordinate estimates are computed. If the magnitude-ratio derived coordinates $(X_{MR}, Y_{MR})$ and the phase-difference derived coordinates $(X_{PD}, Y_{PD})$ disagree, such as being beyond a predetermined distance when compared to each other, the method flows to 254 where the coordinates are rejected and no touch coordinates are reported to the host computer 162. If at 252 the $(X_{MR}, Y_{MR})$ and $(X_{PD}, Y_{PD})$ coordinates are within a predetermined distance, at 256 the touch coordinates are reported to the host computer 162 where, if the live touch event corresponds to a selection on the display 160, the host computer 162 may initiate a particular action or function and/or update the display 160. Such redundancy in signal processing has been observed to greatly reduce the rate of false touches due to ambient sound noise. This method of redundant acoustic fingerprints can be generalized in various ways.

Figure 4:
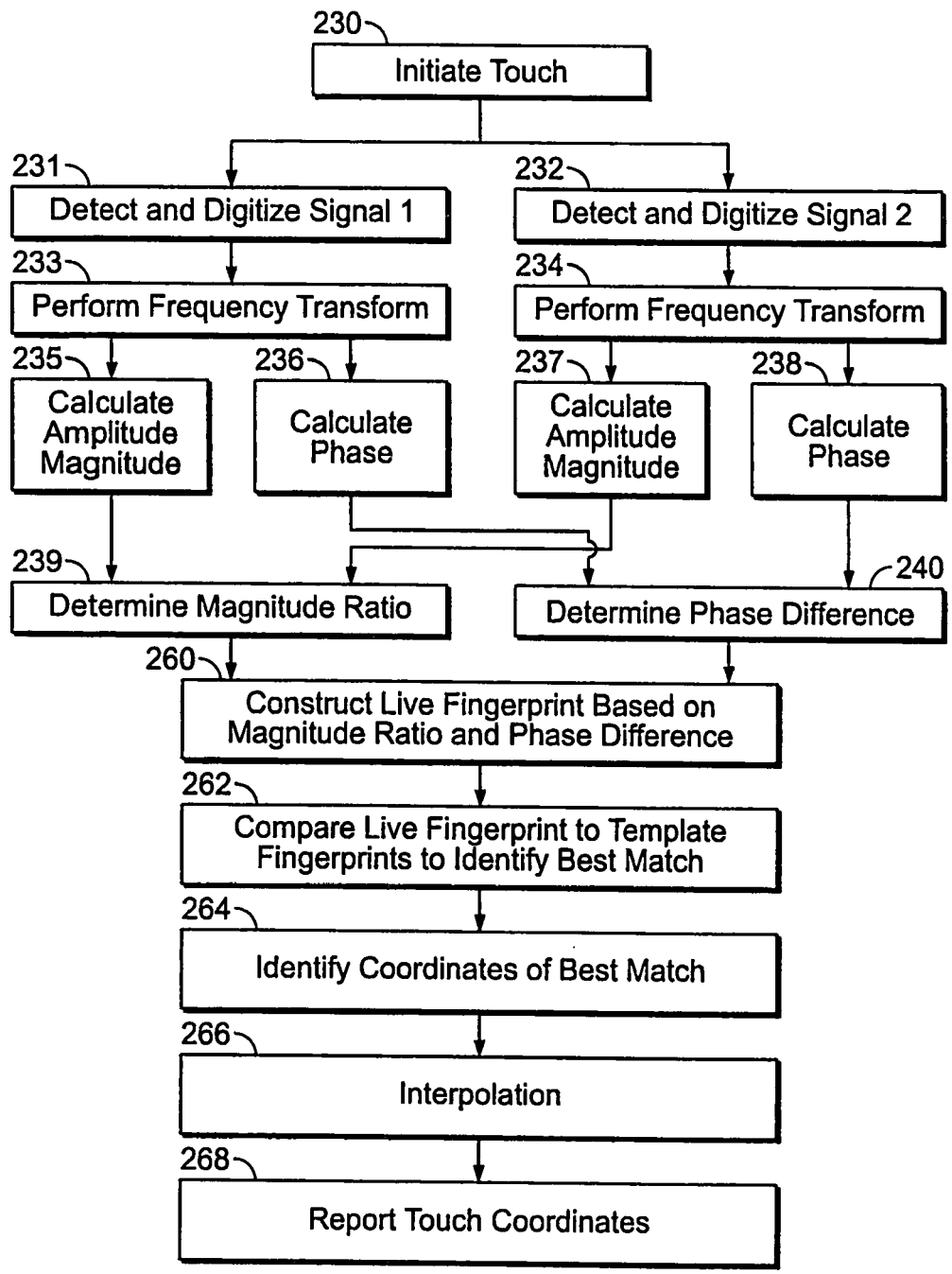
FIG. 4 illustrates a method for determining a location of a live touch event on the touch panel of FIG. 1 based on a single gauge-invariant acoustic fingerprint incorporating both magnitude-ratio and phase-difference information in accordance with an embodiment of the present invention.

FIG. 4 illustrates a method for determining a location of a live touch event on the touch panel 102 of FIG. 1 based on a single gauge-invariant acoustic fingerprint incorporating both magnitude-ratio and phase-difference information. Some item numbers in FIG. 4 are the same as FIG. 3, indicating like processing techniques. Turning to 239 and 240, the magnitude ratio and phase difference based on the two digitized signals have been determined.

At 260, the processor module 128 constructs a single live fingerprint based on the magnitude ratio and phase difference. In particular, for any function of two variables f(x,y) where x is $A_2(\omega)/A_1(\omega)$ and y is phase difference, $f(A_2(\omega)/A_1(\omega), \Delta\phi(\omega))$ is a gauge invariant acoustic fingerprint. For example, if $f(x,y)=\cos(y)\cdot x$ or $f(x,y)=\sin(y)\cdot x$, the following gauge invariant acoustic fingerprints depend only in part on a magnitude ratio.

$$\cos(\Delta\phi(\omega))\cdot(A_2(\omega)/A_1(\omega)) \qquad \text{Equ. 20}$$

$$\sin(\Delta\phi(\omega))\cdot(A_2(\omega)/A_1(\omega)) \qquad \text{Equ. 21}$$

The above two expressions (Equ. 20 and 21) can be expressed as numbers of the frequency transform, and it can be shown that the two expressions are equal to the real and imaginary parts of the complex ratio $S_2(\omega)/S_1(\omega)$, rather than the magnitude and phase. With a bit of further math, these two expressions (Equ. 19 and 20) can be shown to be equivalent to the below two expressions, Equ. 22 and 23.

$$[\text{Re}\{S_1(\omega)\}\cdot\text{Re}\{S_2(\omega)\}+\text{Im}\{S_1(\omega)\}\cdot\text{Im}\{S_2(\omega)\}]/ \\ [\text{Re}\{S_1(\omega)\}^2+\text{Im}\{S_1(\omega)\}^2] \qquad \text{Equ. 22}$$

$$[\text{Re}\{S_1(\omega)\}\cdot\text{Im}\{S_2(\omega)\}-\text{Im}\{S_1(\omega)\}\cdot\text{Re}\{S_2(\omega)\}]/ \\ [\text{Re}\{S_1(\omega)\}^2+\text{Im}\{S_1(\omega)\}^2] \qquad \text{Equ. 23}$$

With respect to implementation, a programmer may note that the quantities $\text{Re}\{S_1(\omega)\}$, $\text{Im}\{S_1(\omega)\}$, $\text{Re}\{S_2(\omega)\}$ and $\text{Im}\{S_2(\omega)\}$ as floating point or integer values are typically the raw output of FFT code. Hence the expressions above (Equ. 22 and 23) provide a gauge-invariant fingerprint that may be computed directly from FFT outputs with no use of square root or transcendental functions, only addition, subtraction, multiplication and division.

Figure 5:
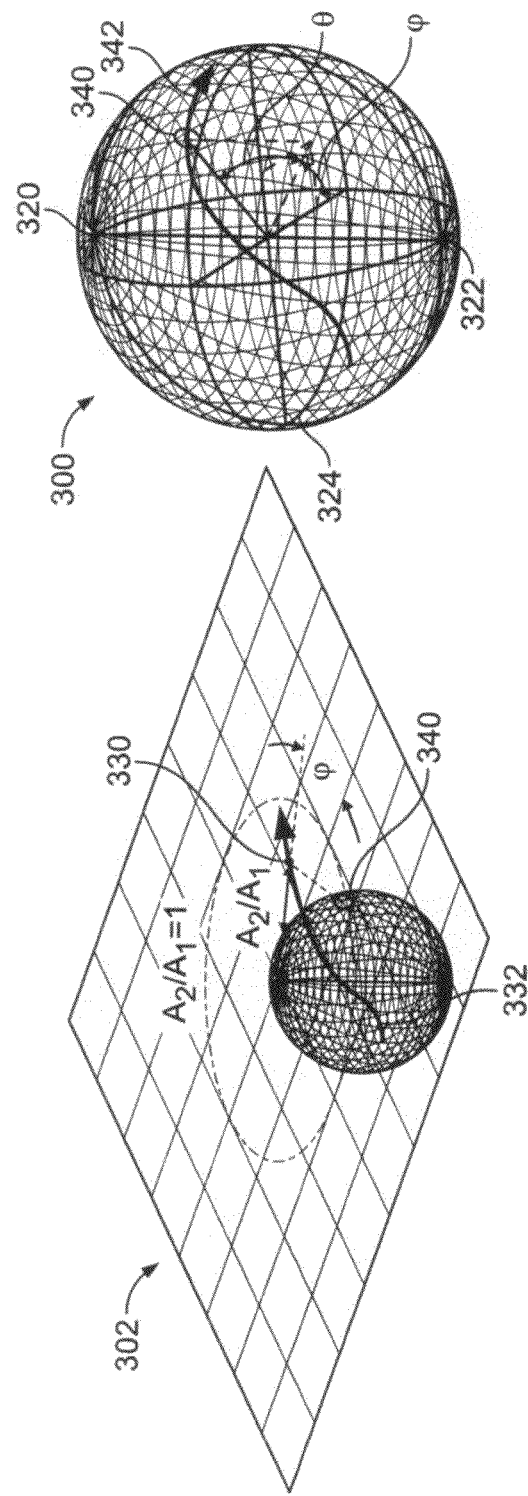
FIG. 5 illustrates a spherical coordinate system for use with acoustic fingerprint algorithms in accordance with an embodiment of the present invention.

An acoustic fingerprint need not be limited to a single real variable as a function of frequency, that is a "profile," but may be generalized to a point in two or higher dimensional space as a function of frequency. Acoustic fingerprints then become sets of points equivalent to "paths" or "trajectories" (parameterized by frequency) within the higher dimensional space. A pair of real variables as a function of frequency may be used to combine and retain all the information contained in the gauge-invariant $A_2(\omega)/A_1(\omega)$ profile and the gauge-invariant phase difference profile $\Delta\phi(\omega)$. One way to combine these two profiles is to form a 2-D vector as a function of frequency $(X(\omega), Y(\omega))=(A_2(\omega)/A_1(\omega), \Delta\phi(\omega))$. For a specific frequency, the corresponding pair of real numbers $(A_2/A_1, \Delta\phi)$ may be regarded as a point 330 (as shown in FIG. 5) in a polar-coordinate plane 302 in which the distance from the origin is the ratio $A_2/A_1$ and the polar angle is $\Delta\phi$. The complete set of points $(A_2(\omega)/A_1(\omega), \Delta\phi(\omega))$ as a function of frequency $\omega$ geometrically defines a trajectory 332 within the polar-coordinate plane 302. For a live touch, trajectory 332 is an acoustic fingerprint that may be compared as similar or dissimilar to a template trajectory stored in a calibration file. Many options exist for constructing acoustic fingerprints in the form of such trajectories. Of particular interest are trajectory coordinate systems that support unbiased matching score algorithms.

With a sufficiently large sampling of frequencies $\omega$ the acoustic fingerprint $(A_2(\omega)/A_1(\omega), \Delta\phi(\omega))$ has been found to be effective even when the resolution is reduced to only one bit; for example the magnitude ratio $A_2(\omega)/A_1(\omega)$ may be set to one if $A_2(\omega) > A_1(\omega)$ and zero otherwise and $\Delta\phi(\omega)$ reduced to its sign bit, namely one if $\Delta\phi(\omega)$ is negative and zero otherwise. Alternatively, magnitude ratios and phase differences may be stored with 8-bit resolution (one byte) or any other resolution. If a fixed number of bits of memory are available for each fingerprint, a number of choices are available regarding a trade-off between the resolution of the fingerprint and the number of frequencies sampled to construct the fingerprint. When processing power is limited, an important advantage of one-bit resolution is that live and template fingerprints may be compared with great computation efficiency using the logical XOR function.

FIG. 5 illustrates a spherical coordinate system for visualizing such acoustic fingerprints as geometrical trajectories. A composite acoustic fingerprint may be formed from the $A_2(\omega)/A_1(\omega)$ and phase-difference profiles to define a trajectory 342 on the surface of a unit sphere 300 in which the latitude $\theta(\omega)$ and longitude $\phi(\omega)$ are functions of frequency as discussed below. For each frequency, there is a point on the sphere such as point 340, and together all of the frequencies form the trajectory such as 342. For purposes of discussion herein, a unit sphere 300 may be referred to with geographical references typically used with the earth, such as North Pole 320, South Pole 322, Equator 324, latitude and longitude. Illustrated are the unit sphere 300 and a corresponding polar-coordinate plane 302 with polar coordinate radius equal to the magnitude ratio $A_2/A_1$ and polar coordinate angle equal to the phase difference $\phi_2 - \phi_1$. On the unit sphere, the longitude (east/west) angle is defined by the phase-difference profile:

$$\phi(\omega) = \Delta\phi(\omega) = \phi_2(\omega) - \phi_1(\omega) \qquad \text{Equ. 24}$$

The latitude (north/south) angle is the example of a magnitude ratio defined by the following function of $A_2(\omega)/A_1(\omega)$:

$$\theta(\omega)=\pi/2-2\arctan(A_2(\omega)/A_1(\omega)) \quad \text{Equ. 25}$$

The entire polar-coordinate plane 302 may be mapped onto the spherical surface of the unit sphere 300 so that the point 330 in the polar-coordinate plane 302 is mapped to the point 340 in the unit sphere 300 and plane trajectory 332 is mapped to sphere trajectory 342. Swapping the arbitrary signal labels "1" and "2" generally changes the distance in the polar-coordinate plane 302 between corresponding points (same frequency) of live and template trajectories, which results in an undesirable condition for score calculations. In contrast, scores based on distances between trajectory points in the unit sphere 300 are free of such biases. Swapping the roles of the first and second sensor signals (as represented by the signals from the sensors 106 and 108 of FIG. 1) only flips the North and South Poles 320 and 322 and rotates the unit sphere 300 by 180° about the polar axis; distances between any two points on the sphere 300 are unchanged. Furthermore, via Monte Carlo simulations, it has been observed that if there is no touch signal and the signals $S_1(t)$ and $S_2(t)$ are simply random noise, then the corresponding values for $(\theta(\omega), \phi(\omega))$ are uniformly and randomly distributed on the surface of the sphere. This implies that a combined magnitude-ratio and phase-difference acoustic fingerprint is represented by the above equations in an unbiased way as a trajectory (as a function of frequency) on the two-dimensional surface of a unit sphere. Due to the image of a path or trajectory on a surface or higher dimensional space, acoustic fingerprints that provide more than one value per frequency may be referred to as "trajectories" as distinct from acoustic fingerprints that provide only one value per frequency which historically have sometimes been referred to as "profiles".

Figure 6:
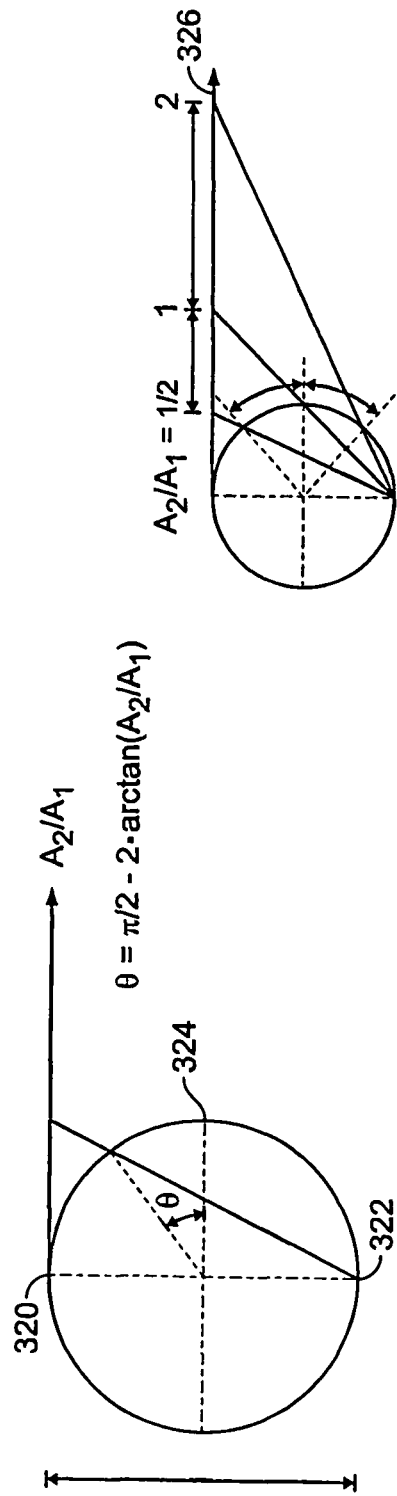
FIG. 6 illustrates mapping of a magnitude ratio to a latitude angle in accordance with an embodiment of the present invention.

FIG. 6 illustrates in more detail the mapping of the ratio $A_2/A_1$ to a latitude angle $\theta=\pi/2-2\arctan(A_2/A_1)$. By way of example, a point proximate to North Pole 320 may correspond to signals $S_1$ and $S_2$ (at a given frequency) received from the sensors 106 and 112 and the sensors 108 and 110, respectively, wherein the signal amplitude magnitude $A_1$ is very large compared to signal amplitude magnitude $A_2$, in which case the signal from the sensors 108 and 110 may simply be noise. A point proximate to South Pole 322 may correspond to signals $S_1$ and $S_2$ wherein the signal amplitude magnitude $A_2$ is very large compared to the signal amplitude magnitude $A_1$, in which case the signal from sensors 106 and 112 may simply be noise. A point proximate to Equator 324 is a location where signal amplitude magnitudes $A_1$ and $A_2$ are approximately equal, that is sensors 106 and 112 generate a signal of amplitude comparable to the signal amplitude from sensors 108 and 110.

Each point of a trajectory based on the live touch may be compared to a corresponding point representing the same frequency of a trajectory of a template fingerprint to determine how close or how far apart the corresponding points are on the unit sphere. Making such a comparison for all points, i.e. for all frequencies, of the pair of trajectories provides a measure of how similar or different the two trajectories, i.e. acoustic fingerprints, are. Such a distance of separation between corresponding trajectory points on the unit sphere provides an unbiased sense of distance that is not provided by the ratio $A_2/A_1$ or the phase difference $\phi_2(\omega)-\phi_1(\omega)$ by itself. If $S_2$ is very small compared to $S_1$ so that $A_2/A_1$ is essentially zero and $S_2$ is noise, $\phi_2(\omega)$ becomes a random value and the phase difference $\phi_2(\omega)-\phi_1(\omega)$ becomes a random value in the full range from plus to minus 180 degrees. Thus $\phi_2(\omega)-\phi_1(\omega)$ is a biased measure of difference in which small random noise fluctuations can sometimes falsely imply big differences in acoustic fingerprints. For amplitudes, a value of $A_2$ twice as large as $A_1$, $A_2=2\cdot A_1$ (or $A_2/A_1=2$), deviates from equality, $A_2=A_1$ (or $A_2/A_1=1$) no more or less than for a value of $A_1$ twice as large as $A_2$, $A_1=2\cdot A_2$ (or $A_2/A_1=\frac{1}{2}$). If the values $A_2/A_1=2$, 1 and ½ are plotted on a number line 326 as is done in FIG. 6, the false impression is given that $A_2/A_1=2$ is further from $A_2/A_1=1$ than $A_2/A_1=\frac{1}{2}$ is from $A_2/A_1=1$. As seen in FIG. 6 this bias is removed by mapping the ratio $A_2/A_1$ to a latitude angle $\theta=\pi/2-2\arctan(A_2/A_1)$.

In practical code, angles in radians, such as the longitude angle $\phi(\omega)$ of Equ. 24, may be scaled and offset for ease of computation and data storage. For example, the $-\pi$ to $+\pi$ radian range $\phi(\omega)$ may be scaled to the signed 8-bit (one byte) integer range from $-128$ to $+127$ by multiplying $\phi(\omega)$ by the scaling factor $(128/\pi)$. Likewise, the latitude angle $\theta(\omega)$ of Equ. 25 can also be scaled (i.e. multiplied by a constant) by the same factor $(128/\pi)$, in which case the $-\pi/2$ to $+\pi/2$ radian range $\theta(\omega)$ is scaled to the range $-64$ to $+63$. If positive integers are preferred, this in turn can be offset to the range from 0 to 127 by simply adding the constant 64. More generally, any acoustic fingerprint may be scaled (multiplied by a constant) or offset (added to a constant) without departing from the scope of the invention.

Returning to FIG. 4, at 262 the processor module 128 may compare the live-signal trajectory (the acoustic fingerprint of 260) to trajectories corresponding to templates stored in one of the calibration files. In this case, the first, second through N template fingerprints 140, 142 and 144 of the calibration file 138 store template trajectories based on both magnitude ratio and phase-difference. When using both the magnitude ratio and the phase difference to determine the location of a live touch (X,Y), in addition to the live-signal trajectory $(\theta(\omega),\phi(\omega))$, a template trajectory $(\Theta(\omega),\Phi(\omega))$ on the surface of a unit sphere 300 corresponds to a calibration touch at a location $(X_0,Y_0)$. The processor module 128 calculates a mismatch distance for all frequencies. The mismatch distance as a function of frequency is calculated between the live-signal trajectory and each of the first, second through N template fingerprints 140, 142 and 144, and may be calculated using Equ. 25 as discussed below.

The proximity of the live touch coordinates (X,Y) to the calibration touch coordinates $(X_0,Y_0)$ is judged by the degree of similarity of the live-signal acoustic fingerprint $(\theta(\omega),\phi(\omega))$ to the template fingerprint $(\Theta(\omega),\Phi(\omega))$. At each frequency $\omega$, the live-touch and the template correspond to the points $(\theta(\omega),\phi(\omega))$ and $(\Theta(\omega),\Phi(\omega))$ on the unit sphere 300. $\alpha(\omega)$ is the shortest distance on the sphere 300 between the two points, and is also the (positive) angle in radians between unit vectors from the center of the sphere 300 to each of the two points $(\theta(\omega),\phi(\omega))$ and $(\Theta(\omega),\Phi(\omega))$ on the surface of the unit sphere. Equ. 26 allows the calculation of the mismatch distance parameter $\alpha(\omega)$ from the live-signal acoustic fingerprint $(\theta(\omega),\phi(\omega))$ and the template acoustic fingerprint $(\Theta(\omega),\Phi(\omega))$ (stored as first, second through N template fingerprints 140, 142 and 144).

$$\cos(\alpha(\omega))=\cos((\theta(\omega)-\Theta(\omega))+\cos(\theta(\omega))\cdot\cos(\Theta(\omega))\cdot\cos(\phi(\omega)-\Phi(\omega))) \quad \text{Equ. 26}$$

In practice, the distance parameter $\alpha(\omega)$ is computed for a large number of discrete values $\omega_k$ where k is an integer index. The sum over frequencies of the distance parameter, namely $\Sigma\alpha(\omega_k)$, provides an overall score of the degree of mismatch between the live-signal and one, some or all of the first, second through N template fingerprints 140, 142 and 144.

Mathematically, the scoring function may be represented as the following integral.

$$\int \alpha(\omega) d\omega \qquad \text{Equ. 27}$$

Furthermore, if f(x) is any monotonically increasing function for $0<x<\pi$, $\int f(\alpha(\omega))d\omega$ is also a possible scoring function. Both $\int\{1-\cos(\alpha(\omega))\}d\omega$ and $\int\sqrt{\{1-\cos(\alpha(\omega))\}}d\omega$, for example, are possible options given the above explicit formula for $\cos(\alpha(\omega_k))$. At 264 of FIG. 4 the processor module 128 identifies the (X,Y) coordinates of the best match identified at 262. Optionally, thresholding may be accomplished as discussed previously with FIGS. 2 and 3. At 266, the processor module 128 may accomplish interpolation as previously discussed, and at 268 the processor module 128 reports the touch coordinates to the host computer 162.

Gauge invariant acoustic fingerprints are also useful in bending-wave touch systems with more than two signals. Therefore, more than two signals may be used to construct one, two or more acoustic fingerprints. In general, more than two signals are received from which one or more acoustic fingerprints are constructed. The acoustic fingerprints may be constructed based on phase-difference, magnitude ratio, a different construction, and/or a combination thereof. If more than one acoustic fingerprint is constructed, the benefits of redundant validation may be realized. As discussed previously with FIG. 3, redundant validation provides robust touch point detection in all sizes of touchscreens and especially for smaller-sized touchscreens and touchscreens used in noisy environments.

Figure 7:
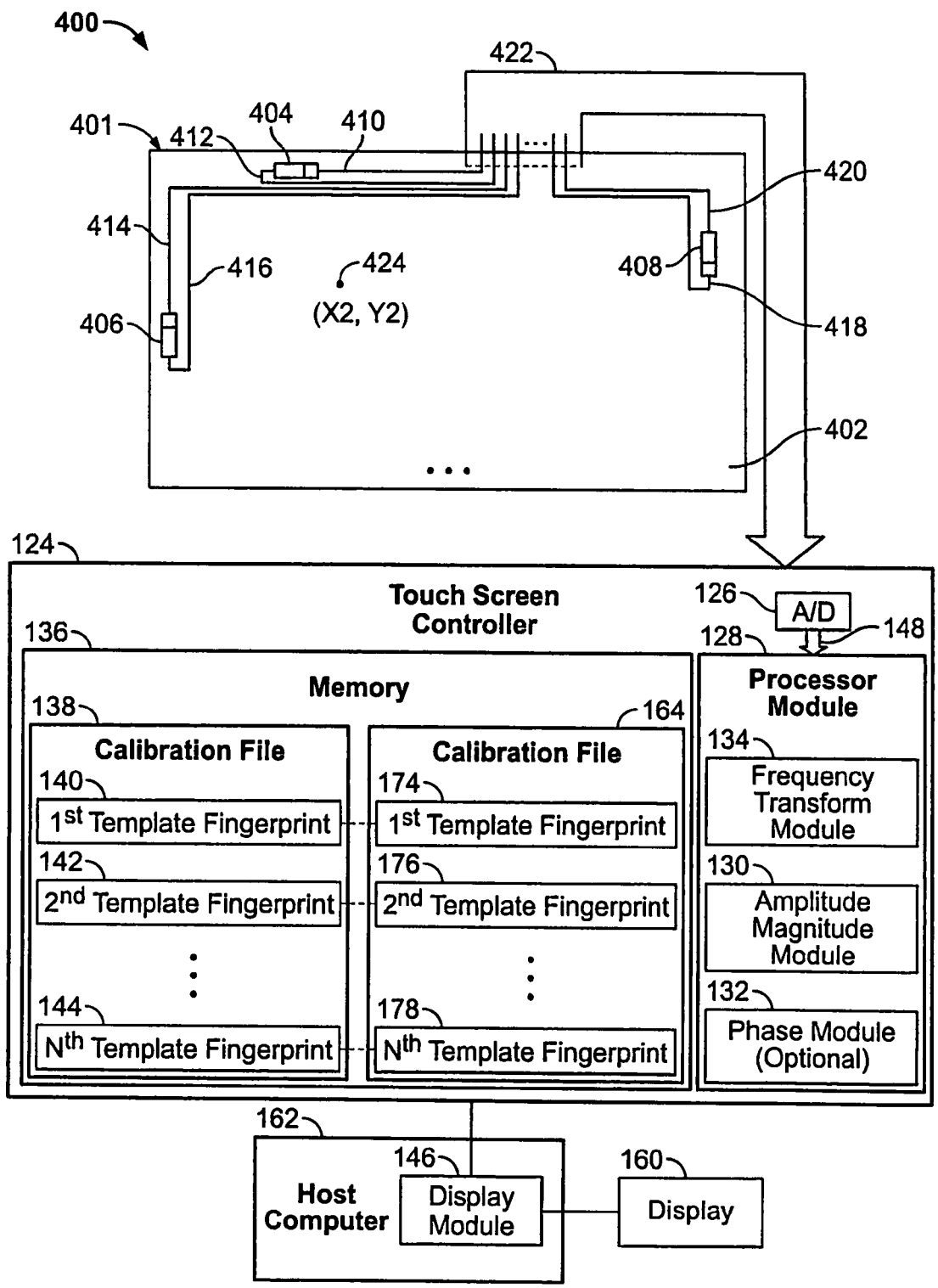
FIG. 7 illustrates an acoustic fingerprint based touch system formed in accordance with an embodiment of the present invention that has a touch panel that generates two or more signals to be used for touch detection.

FIG. 7 illustrates an acoustic fingerprint based touch system 400 having a touch panel 401 that generates two or more signals that are used for touch detection. The touch panel 401 has a substrate 402 upon which first, second through M sensors 404, 406 and 408 are mounted. In FIG. 7, a single sensor 404, 406 and 408 is used to produce a signal rather than a pair of piezos or microphones interconnected in anti-series (as shown on FIG. 1). Traces 410 and 412 convey a first signal associated with the first sensor 404, traces 414 and 416 convey a second signal associated with the second sensor 406, and traces 418 and 420 convey an Mth signal associated with the M sensor 408. Cable 422 carries the signals to the touchscreen controller 124 as discussed previously in FIG. 1. The elements within the touchscreen controller 124, display 160 and host computer 162 of FIG. 1 are reproduced in connection with the touch system 400.

Generalizing the concept of a gauge transformation, touch signals subject to changes in irrelevant touch characteristics may be represented as a set of digitized signals $S_1(t)$, $S_2(t) \ldots S_M(t)$ where M is any integer greater than or equal to two. The corresponding frequency transform signals are $S_1(\omega), S_2(\omega) \ldots S_M(\omega)$. Given an amplitude magnitude gauge function $G(\omega)$ and a phase gauge function $\gamma(\omega)$, the gauge transformed signals are as follows.

$$S_1(\omega) = A_1(\omega) \cdot e^{i\phi_1(\omega)} \rightarrow A'_1(\omega) \cdot e^{i\phi'_1(\omega)} = G(\omega) \cdot A_1(\omega) \cdot e^{i\phi_1(\omega) + i\gamma(\omega)} \qquad \text{Equ. 28}$$

$$S_2(\omega) = A_2(\omega) \cdot e^{i\phi_2(\omega)} \rightarrow A'_2(\omega) \cdot e^{i\phi'_2(\omega)} = G(\omega) \cdot A_2(\omega) \cdot e^{i\phi_2(\omega) + i\gamma(\omega)} \qquad \text{Equ. 29}$$

... through ...

$$S_M(\omega) = A_M(\omega) \cdot e^{i\phi_M(\omega)} \rightarrow A'_M(\omega) \cdot e^{i\phi'_M(\omega)} = G(\omega) \cdot A_M(\omega) \cdot e^{i\phi_M(\omega) + i\gamma(\omega)} \qquad \text{Equ. 30}$$

Equivalently, the following is given.

$$A_1(\omega) \rightarrow A'_1(\omega) = G(\omega) \cdot A_1(\omega) \phi_1(\omega) \rightarrow \phi'_1(\omega) = \phi_1(\omega) + \gamma(\omega) \qquad \text{Equ. 31}$$

$$A_2(\omega) \rightarrow A'_2(\omega) = G(\omega) \cdot A_2(\omega) \phi_2(\omega) \rightarrow \phi'_2(\omega) = \phi_2(\omega) + \gamma(\omega) \qquad \text{Equ. 32}$$

... through ...

$$A_M(\omega) \rightarrow A'_M(\omega) = G(\omega) \cdot A_M(\omega) \phi_M(\omega) \rightarrow \phi'_M(\omega) = \phi_M(\omega) + \gamma(\omega) \qquad \text{Equ. 33}$$

To construct a generalized gauge-invariant magnitude ratio, let $\alpha_1, \alpha_2, \ldots \alpha_M$ be a set of exponents that sum to zero, that is $\Sigma \alpha_i = 0$. A generalized magnitude ratio may be defined to be the following product.

$$A_1(\omega)^{\alpha_1} \cdot A_2(\omega)^{\alpha_2} \cdot \ldots \cdot A_M(\omega)^{\alpha_M} \qquad \text{Equ. 34}$$

Under a gauge transformation, this product is gauge-invariant as is shown below.

$$\begin{aligned} A_1(\omega)^{\alpha_1} \cdot A_2(\omega)^{\alpha_2} \cdot \ldots \cdot A_N(\omega)^{\alpha M} &\rightarrow \\ \{G(\omega) \cdot A_1(\omega)\}^{\alpha_1} \cdot \{G(\omega) \cdot A_2(\omega)\}^{\alpha_2} \cdot \ldots \cdot \{G(\omega) \cdot A_N(\omega)\}^{\alpha M} &= \\ \{G(\omega)^{\alpha_1} \cdot G(\omega)^{\alpha_2} \cdot \ldots \cdot G(\omega)^{\alpha M}\} \cdot & \\ \{A_1(\omega)^{\alpha_1} \cdot A_2(\omega)^{\alpha_2} \cdot \ldots \cdot A_N(\omega)^{\alpha M}\} &= \\ G(\omega)^{\alpha_1 + \alpha_2 + \ldots + \alpha M} \cdot \{A_1(\omega)^{\alpha_1} \cdot A_2(\omega)^{\alpha_2} \cdot \ldots \cdot A_N(\omega)^{\alpha M}\} &= \\ G(\omega)^{\Sigma\alpha_1} \cdot \{A_1(\omega)^{\alpha_1} \cdot A_2(\omega)^{\alpha_2} \cdot \ldots \cdot A_N(\omega)^{\alpha M}\} &= \\ G(\omega)^0 \cdot \{A_1(\omega)^{\alpha_1} \cdot A_2(\omega)^{\alpha_2} \cdot \ldots \cdot A_N(\omega)^{\alpha M}\} &= \\ A_1(\omega)^{\alpha_1} \cdot A_2(\omega)^{\alpha_2} \cdot \ldots \cdot A_N(\omega)^{\alpha M} & \end{aligned} \qquad \text{Equ. 35}$$

Likewise, for any function f(x), $f(A_1(\omega)^{\alpha_1} \cdot A_2(\omega)^{\alpha_2} \cdot \ldots \cdot A_N(\omega)^{\alpha M})$ is also a gauge-invariant acoustic fingerprint. For M=2, $\alpha_1 = -1$ and $\alpha_2 = +1$, this form reduces to the previous magnitude-ratio expression $A_2(\omega)/A_1(\omega)$. For three digitized signals, one example is M=3, $\alpha_1 = +1$, $\alpha_2 = +1$ and $\alpha_3 = -2$ which corresponds to a generalized magnitude-ratio for three signals:

$$A_1(\omega) \cdot A_2(\omega) / A_3(\omega)^2 \qquad \text{Equ. 36}$$

Furthermore if f(x, y, . . . z) is any function of multiple variables, each argument may be replaced by a different generalized magnitude-ratio and the resulting acoustic fingerprint will still be gauge invariant. Therefore, acoustic fingerprints may be based at least in part on any function of such generalized magnitude ratios. Consistent with the purpose of providing gauge invariance, the term magnitude ratio is broadly defined to include generalized magnitude ratios as well as functions of one or more generalized magnitude ratios.

Figure 8:
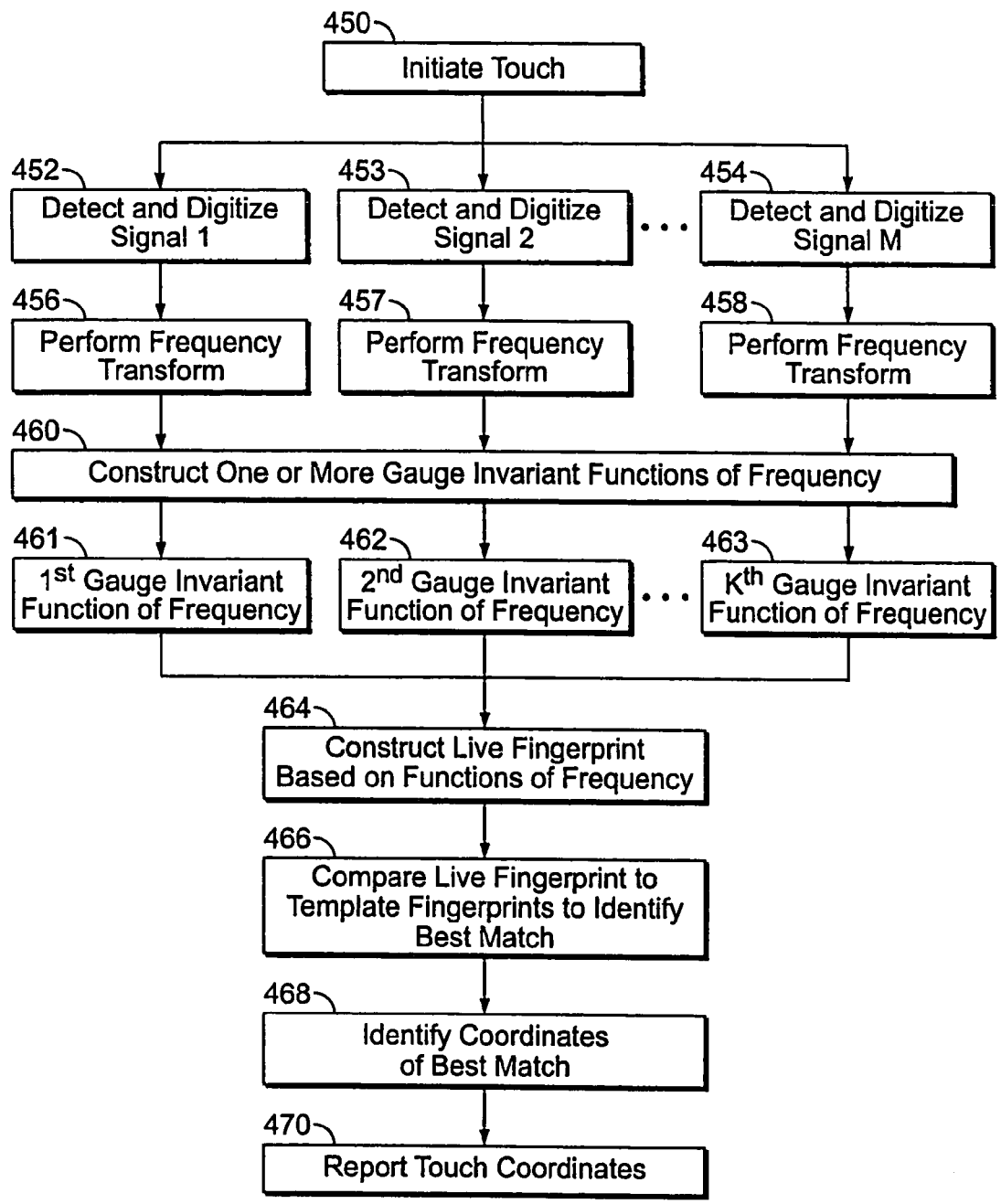
FIG. 8 illustrates a method for determining a location of a live touch event on the touch panel of FIG. 7 based on one acoustic fingerprint that is constructed based on two or more digitized signals in accordance with an embodiment of the present invention.

Any magnitude ratio, including generalized magnitude ratios, can be used to construct a single acoustic fingerprint corresponding to a single touch coordinate determination. FIG. 8 illustrates a method for determining a location of a live touch event on the touch panel 401 of FIG. 7 based on one live fingerprint that is constructed based on two or more digitized signals. At 450, an operator initiates a touch event at an (X,Y) location on the touch panel 401 that has first, second through M sensors 404, 406 and 408. The touch event may be the point (X2, Y2) 424. At 452, 453 and 454 the A/D converter 126 detects the first though M signals as discussed previously and outputs corresponding sets of digitized signals 148 to the processor module 128.

At 456, 457 and 458 the frequency transform module 134 performs a frequency transform on the sets of digitized signals 148 corresponding to the first through M sets of digitized signals, and outputs first, second through M frequency transform data sets. The information extracted from the first, second through M frequency transform data sets is used to construct one live fingerprint. At 460 the processor module 128 constructs one or more gauge invariant functions of frequency, such as first, second through Kth gauge invariant functions of frequency 461, 462 and 463. By way of example, at least one of the gauge invariant functions may be based on a magnitude ratio as discussed previously. The gauge invariant functions of frequency may also be constructed from phase differences and magnitude ratios as discussed previously as well as the generalized phase differences discussed later.

At 464, the processor module 128 constructs a live fingerprint (such as a multi-dimensional trajectory) based on the first, second through Kth gauge invariant functions of frequency. At 466, the processor module 128 compares the live fingerprint of the live touch event to the template fingerprints (such as the first, second through N template fingerprints 140, 142 and 144) to determine differences there-between and to identify the template fingerprint that is a "best match" with respect to the live fingerprint. As discussed, the processor module 128 may determine the lowest score(s) that indicates a possible candidate position or best matching template fingerprint.

Optionally, thresholding may be used as discussed previously at 214 of FIG. 2. At 468, the processor module 128 identifies the (X,Y) coordinates of the best match identified at 466. At 470 the touch coordinates are reported to the host computer 162 where, if the live touch event corresponds to a selection on the display 160, the host computer 162 may initiate a particular action or function and/or update the display 160.

In one embodiment, two or more estimates of touch coordinates may be determined by constructing two or more distinct acoustic fingerprints each of which is used to independently determine a candidate touch position via its own matching score. As noted above, false touches are suppressed by requiring consistency of such redundantly computed coordinates. For example, consider an acoustic fingerprint based touchscreen system using, for example, the touch panel 401 of FIG. 7 wherein M=3 sensors (first, second, third (M) sensors 404, 406 and 408) and first though third digitized and frequency transformed signals $S_1(\omega)$, $S_2(\omega)$, and $S_3(\omega)$ (as discussed in 456, 457 and 458 of FIG. 8), from which amplitude magnitudes $A_1(\omega)$, $A_2(\omega)$, and $A_3(\omega)$ are derived. Estimated touch coordinates $(X_{E1},Y_{E1})$, $(X_{E2},Y_{E2})$ and $(X_{E3},Y_{E3})$ can be independently computed using first through third separate live fingerprints constructed from the gauge-invariant ratios $A_2(\omega)/A_1(\omega)$, $A_3(\omega)/A_2(\omega)$, and $A_1(\omega)/A_3(\omega)$ respectively. Three-way agreement may be required before reporting a touch to the host computer 162. Alternatively, agreement of two out of three may be deemed sufficient for background noise suppression.

Therefore, acoustic fingerprints may be constructed purely from magnitude ratio profiles. Alternatively, acoustic fingerprints may be constructed from a combination of both magnitude-ratio and phase-difference profiles. An example is $\cos(\Delta\phi) \cdot A_2(\omega)/A_1(\omega)$. In the case of more than two digitized signals, phase differences may be generalized as follows. For example, $\phi_1(\omega)$, $\phi_2(\omega)$, ... $\phi_M(\omega)$ are signal phases as a function of frequency for M digitized signals and $C_1, C_2, \ldots C_M$ is a set of coefficients that sum to zero, $\Sigma C_i = 0$. The generalized phase differences may be defined to be of the form $C_1 \cdot \phi_1(\omega) + C_2 \cdot \phi_2(\omega) \ldots + C_M \cdot \phi_M(\omega)$. Using Equations 31, 32 and 33 it can be shown that generalized phase differences are gauge invariant. For example, the quantity $\phi_1(\omega) + \phi_2(\omega) - 2 \cdot \phi_M(\omega)$ is one possible generalized phase difference for three signals. Therefore, acoustic fingerprint definitions may be functions of both magnitude ratio profiles as well as generalized phase differences. Consistent with the purpose of providing gauge invariance, the term phase difference is broadly defined to include generalized phase differences as well as functions of one or more generalized phase differences.

Any phase difference, including generalized phase differences, further increases the options for redundant coordinate estimates. For example, an acoustic fingerprint based touch system may have three or more sensors and three digitized and frequency transformed signals $S_1(\omega)$, $S_2(\omega)$, and $S_3(\omega)$, from which amplitude magnitudes $A_1(\omega)$, $A_2(\omega)$, and $A_3(\omega)$ as well as phases $\phi_1(\omega)$, $\phi_2(\omega)$, and $\phi_3(\omega)$ are derived. Two or more acoustic fingerprints may be constructed from, for example, two or more of the following functions of frequency: $A_2(\omega)/A_1(\omega)$, $A_3(\omega)/A_2(\omega)$, $A_1(\omega)/A_3(\omega)$, $A_1(\omega) \cdot A_2(\omega)/A_3(\omega)^2$, $A_2(\omega) \cdot A_3(\omega)/A_1(\omega)^2$, $A_3(\omega) \cdot A_1(\omega)/A_2(\omega)^2$, $(\phi_1(\omega) - \phi_2(\omega))$, $(\phi_2(\omega) - \phi_3(\omega))$, $(\phi_3(\omega) - \phi_1(\omega))$, $\phi_1(\omega) + \phi_2(\omega) - 2 \cdot \phi_3(\omega)$, and the like, to produce two or more estimated touch coordinates If three or more redundant coordinate calculations are performed, then reporting of touch coordinates to the host computer 162 may be determined by any level of agreement, e.g. three out of four.

Figure 9:
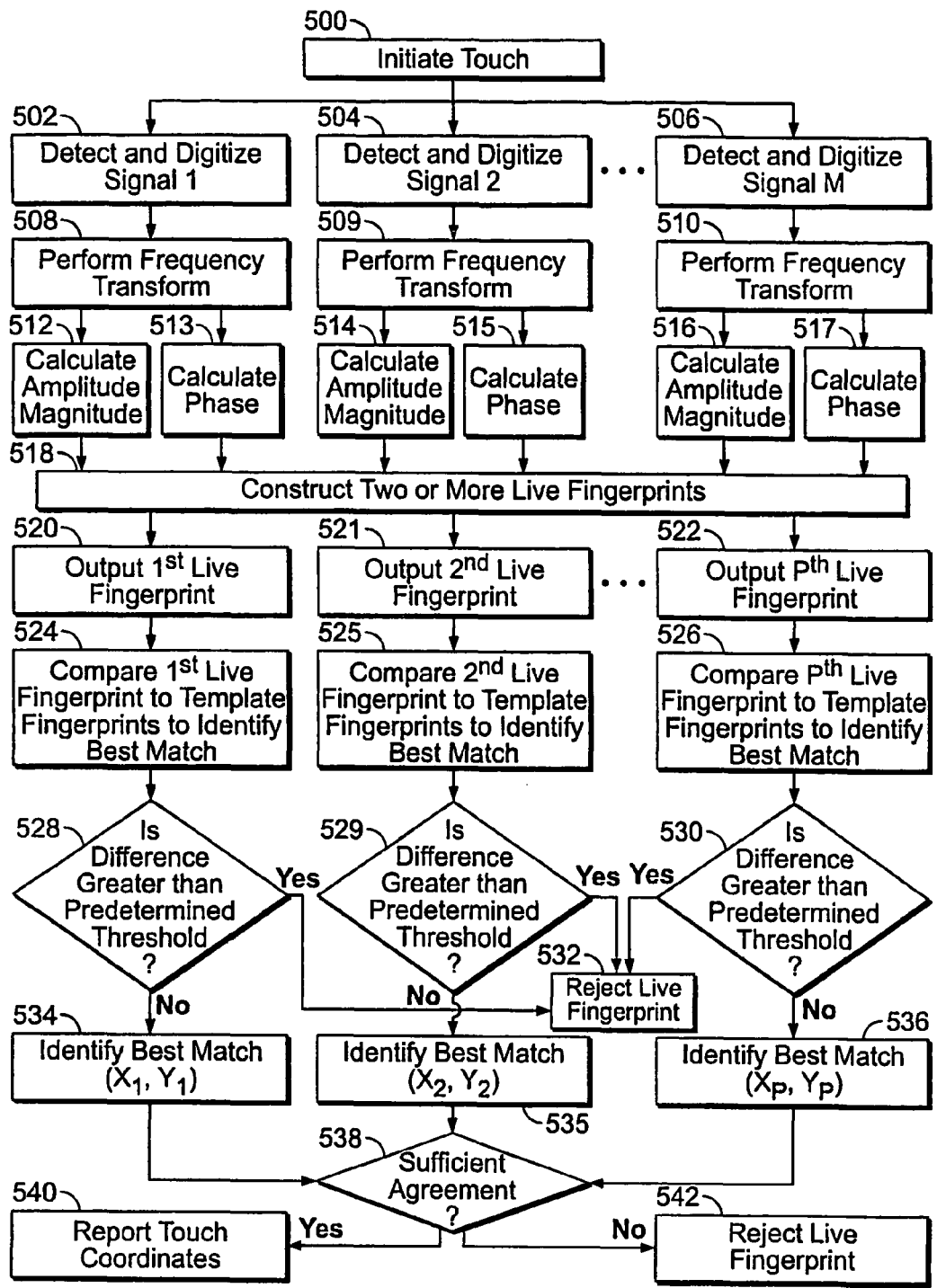
FIG. 9 illustrates a method for determining a location of a live touch event on the touch panel of FIG. 7 based on two or more acoustic fingerprints in accordance with an embodiment of the present invention.

FIG. 9 illustrates a method for determining a location of a live touch event on the touch panel 401 of FIG. 7 based on two or more acoustic fingerprints that are constructed based on two or more digitized signals. At 500, an operator initiates a touch event at an (X,Y) location on the touch panel 401, such as point (X2,Y2) 424. At 502, 504 and 506, the A/D converter 126 detects the first, second through M signals as discussed previously and outputs first, second through M sets of digitized signals 148 to the processor module 128.

At 508, 509 and 510 the frequency transform module 134 performs a frequency transform on first, second though M digitized signals 148 corresponding to the first, second through M sensor signals, and outputs first, second through M frequency transform data sets. In this example, information may be extracted from the first, second through M frequency transform data sets based on magnitude and phase to construct two or more separate fingerprints. However, it should be understood that one, two, less than M, or more than M fingerprints may be constructed based on magnitude ratio and/or phase difference and that other acoustic fingerprint construction may be used.

At 512, 514 and 516 the amplitude magnitude module 130 calculates first, second and M sets of amplitude magnitudes based on the frequency transform data sets of 508, 509, and 510, respectively, over the frequency range. At 518, the processor module 128 may construct at least one live fingerprint based on magnitude ratio. The amplitude magnitude module 130 determines the magnitude ratio based on the amplitude magnitudes, and may combine different signals such as determining a first magnitude ratio based on the first and Mth amplitude magnitudes and a second magnitude ratio based on the second and Mth amplitude magnitudes. Therefore, any combination of signals may be used, and some signals may be utilized more than once.

A live fingerprint based on the phase difference can be constructed by determining phases and computing a phase difference profile. At 513, 515 and 517, the phase module 132 determines the phase of each of the first, second through M frequency transform data sets, and at 518 the processor module 128 may construct a live fingerprint based on the phase difference. The phase module 132 determines the phase difference between two or more signals, and any grouping of two or more signals may be used.

The processor module 128 outputs first, second through Pth live fingerprints 520, 521 and 522. At 524, 525 and 526, the processor module 128 compares the corresponding first, second through Pth live fingerprint of the live touch event to the template fingerprints to determine differences there-between and to identify the first, second through Pth template fingerprints that are "best matches" with respect to the first, second through Pth live fingerprints. In this example, the template fingerprints may be the first, second through N template fingerprints 140, 142 and 144 within the calibration file 138, the first, second through N template fingerprints 174, 176 and 178 within the calibration file 164, or the fingerprints within an additional or other calibration file (not shown). Again, the processor module 128 may determine a score(s) (which may be one of a lowest or highest score) that indicates a possible candidate position or best matching template fingerprint.

At 528, 529 and 530 the processor module 128 may compare the difference between the best matching template fingerprints and the live fingerprint to a predetermined threshold. Optionally, thresholding may be accomplished for only one of the best matching template fingerprints and the live fingerprint. Optionally, no thresholding may be used.

When thresholding is used, if the difference is greater than the predetermined threshold, the method passes to 532 and the live fingerprint is rejected. Optionally, the method may be terminated based on a single rejection. In another embodiment, the method may be terminated if more than one rejection is identified or if a predetermined percentage of live fingerprints are rejected. If the difference at 528, 529 and/or 530 is less than the predetermined threshold, at 534, 535 and 536 the processor module 128 identifies the (X,Y) coordinates of the best match(es) identified at 524, 525 and 526, respectively.

At 538 the processor module 128 determines if there is sufficient agreement between the detected (X,Y) coordinates. For example, the processor module 128 may compare each of the coordinates to each other. If one or more coordinates are beyond a predetermined distance from the others, the processor module 128 may determine that the coordinates are erroneous and discard the particular coordinates. In another embodiment, the processor module 128 may compute an average X and an average Y value based on all of the coordinate points. Then, the Euclidean distance may be computed between the average point and each of the individual points. If the maximum distance of any point is less than a predetermined distance from the average, or, for example, within a diameter of a circle having a predetermined size formed around the average (X,Y) point, the particular point may be kept as a point that agrees. Points outside of the diameter of the circle may be discarded. If a sufficient number of points agree, such as a majority or a predetermined percentage of the points, the processor module 128 determines that a valid touch has been detected and at 540 reports a set of touch coordinates to the host computer 162. The set of touch coordinates may be the average coordinates for example. If the processor module 128 determines that agreement is not met, the method passes to 542 where the coordinates are rejected and no touch coordinates are reported to the host computer 162. This may be the case wherein a noisy environment causes false touches to be detected.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A method of detecting a touch event on an acoustic fingerprint based touch system, comprising:
    digitizing first signals from at least a first sensor to form a first set of digitized signals and second signals from at least a second sensor to form a second set of digitized signals, wherein the at least first and second sensors are associated with a touch panel;
    performing a frequency transform upon the first set of digitized signals and the second set of digitized signals to form respectively first and second frequency transform data sets of frequency components;
    constructing from a touch a first live fingerprint and a second live fingerprint, wherein at least the first live fingerprint is based on the first and second frequency transform data sets and is gauge-invariant such that how the touch occurs minimally impacts the first live fingerprint; and
    identifying the location of the touch based on the first and second live fingerprints.

2. The method of claim 1, wherein at least the first live fingerprint is constructed based on a magnitude ratio, the magnitude ratio comprising a ratio between the amplitude magnitudes of the first frequency transform data set and the second frequency transform data set.

3. The method of claim 1, wherein at least the first live fingerprint is constructed based on a phase difference, the phase difference comprising a difference between phase information associated with the first frequency transform data set and second frequency transform data sets.

4. The method of claim 1, wherein the identifying comprises:
    comparing each of the first and second live fingerprints to a plurality of template fingerprints wherein each of the template fingerprints is associated with coordinates on the touch panel; and
    identifying a best matching template fingerprint associated with each of the first and second live fingerprints based on the comparison to provide the location of the touch.

5. The method of claim 1, wherein the identifying comprises:
    identifying at least first and second best matching template fingerprints associated with the first and second live fingerprints wherein the template fingerprints are each associated with coordinates on the touch panel;
    determining a distance between the coordinates associated with the at least first and second best matching template fingerprints; and identifying the location of the touch based on the coordinates associated with the at least first and second best matching template fingerprints when the distance is less than a predetermined threshold.

6. The method of claim 1, wherein the identifying comprises identifying at least first and second best matching template fingerprints associated with the first and second live fingerprints wherein the at least first and second best matching template fingerprints are each associated with coordinates on the touch panel; and determining a distance between the coordinates associated with the at least first and second best matching template fingerprints; and wherein the method further comprises discarding the first and second live fingerprints when the distance is greater than a predetermined threshold.

7. The method of claim 1, wherein the first live fingerprint is constructed based on a magnitude ratio, the magnitude ratio comprising a ratio between the amplitude magnitudes of the first frequency transform data set and the second frequency transform data set, and the second live fingerprint is constructed based on a phase difference, the phase difference comprising a difference between phase information associated with the first frequency transform data set and second frequency transform data sets.

8. The method of claim 1, wherein the first live fingerprint is gauge-invariant such that the first live fingerprint is independent of touch characteristics other than the location of the touch.

9. An acoustic fingerprint based touch system, comprising:
a touch panel;
at least two sensors interconnected with the touch panel, the at least two sensors obtaining at least two signals associated with the touch panel, the at least two sensors including a first sensor obtaining a first signal and a second sensor obtaining a second signal, the at least two signals including the first and second signals; and
a processor module to perform frequency transforms based on the first signal to produce a first frequency transform signal and based on the second signal to produce a second frequency transform signal, the processor module constructing from a touch event at least two live fingerprints each based on the first and second frequency transform signals, the processor module determining coordinates associated with the touch event on the touch panel based on the at least two live fingerprints, wherein each of the at least two live fingerprints is gauge-invariant such that how the touch event occurs minimally impacts the at least two live fingerprints.

10. The touch system of claim 9, further comprising a memory storing at least one calibration file having a plurality of template fingerprints associated with known coordinates on the touch panel, the processor module comparing the at least two live fingerprints to the plurality of template fingerprints to determine differences there-between, the processor module further determining the coordinates associated with the touch event based on the differences.

11. The touch system of claim 9, further comprising a memory storing at least one calibration file having a plurality of template fingerprints associated with known coordinates on the touch panel, the processor module comparing the at least two live fingerprints to the plurality of template fingerprints to determine differences there-between, the processor module rejecting a live fingerprint when the associated difference is greater than a predetermined threshold based on spatial distance.

12. The touch system of claim 9, further comprising a memory storing at least one calibration file having a plurality of template fingerprints associated with known coordinates on the touch panel, the processor module identifying at least first and second best matching template fingerprints associated with each of the at least two live fingerprints, the processor module determining the coordinates associated with the touch event based on sufficient agreement between the at least two live fingerprints.

13. The touch system of claim 9, further comprising a memory storing at least one calibration file having a plurality of template fingerprints associated with known coordinates on the touch panel, the processor module identifying at least first best matching template fingerprint associated with a first live fingerprint of the at least two live fingerprints and second best matching template fingerprints associated with a second live fingerprint of the at least two live fingerprints, the processor module determining the coordinate location associated with the touch event based on an average coordinate, wherein the average coordinate is based on the coordinates associated with at least the first best matching template fingerprint and the second best matching template fingerprint.

14. The touch system of claim 9, wherein the processor module calculates amplitude magnitudes and phase information associated with the frequency transform signals, the processor module determining a magnitude ratio between the amplitude magnitudes and a phase difference based on the phase information, the processor module constructing a first live fingerprint of the at least two live fingerprints based on the magnitude ratio and a second live fingerprint of the at least two live fingerprints based on the phase difference.

15. The touch system of claim 9, wherein the at least two live fingerprints comprise P live fingerprints where P is an integer greater than two, the system further comprising a memory storing at least one calibration file having a plurality of template fingerprints associated with known coordinates on the touch panel, the processor module identifying P best matching template fingerprints of the plurality of template fingerprints associated with the P live fingerprints, the processor module determining the coordinates associated with the touch event based on majority logic.

16. The touch system of claim 9, wherein the each of the at least two live fingerprints is gauge-invariant such that the each of the at least two live fingerprints is independent of touch characteristics other than the coordinates associated with the touch event.

17. A non-transitory computer readable medium for use in an acoustic fingerprint based touch system, comprising:
instructions to digitize signals from at least two sensors on a touch panel to form first and second sets of digitized signals, the at least two sensors including a first sensor and a second sensor, the first set of digitized signals associated with the first sensor and the second set of digitized signals associated with the second sensor;
instructions to perform a frequency transform upon the first and second sets of digitized signals to form first and second frequency transform data sets of frequency components;
instructions to construct for a touch event at least two live fingerprints each based on the first and second frequency transform data sets, wherein and each of the at least two live fingerprints is gauge-invariant such that how the touch event occurs minimally impacts the at least two live fingerprints; and
instructions to determine the coordinates on the touch panel associated with the touch event based on the at least two live fingerprints.

18. The computer readable medium of claim 17, further comprising:

instructions to calculate amplitude magnitudes and phase information associated with the first and second frequency transform data sets;

instructions to determine a magnitude ratio between the amplitude magnitudes and a phase difference based on the phase information; and instructions to construct a first live fingerprint of the at least two live fingerprints based on the magnitude ratio and a second live fingerprint of the at least two live fingerprints based on the phase difference.

19. The computer readable medium of claim 17, wherein the at least two live fingerprints comprise P live fingerprints where P is an integer greater than two, the method further comprising:

instructions to compare the P live fingerprints to a plurality of template fingerprints associated with known coordinates on the touch panel;

instructions to identify P best matching template fingerprints associated with the P live fingerprints based on the comparison; and instructions to determine the coordinates associated with the touch event based on the P best matching template fingerprints and majority logic.

20. The computer readable medium of claim 17, further comprising:

instructions to compare the at least two live fingerprints to a plurality of template fingerprints associated with known coordinates on the touch panel;

instructions to identify best matching template fingerprints of the plurality of template fingerprints associated with the at least two live fingerprints;

instructions to determine a distance between the coordinates associated with the best matching template fingerprints; and instructions to identify the coordinates on the touch panel associated with the touch event based on the coordinates associated with the at least first and second best matching template fingerprints of the best matching template fingerprints when the distance is less than a predetermined threshold.

21. The computer readable medium of claim 17, wherein the at least two live fingerprints comprise at least a first and second live fingerprints, the computer readable medium further comprising instructions to compare the first and second live fingerprints to first and second calibration files, respectively, wherein each of the first and second calibration files comprises a plurality of template fingerprints associated with known coordinates on the touch panel, wherein the plurality of template fingerprints within the first calibration file are constructed based on a first processing method and the plurality of template fingerprints within the second calibration file are constructed based on a second processing method that is different with respect to the first processing method.

22. The computer readable medium of claim 17, wherein the each of the at least two live fingerprints is gauge-invariant such that the each of the at least two live fingerprints is independent of touch characteristics other than the coordinates on the touch panel.

\* \* \* \* \*